(12) United States Patent
Witte et al.

(10) Patent No.: US 11,801,123 B2
(45) Date of Patent: Oct. 31, 2023

(54) TOOTH ATTACHMENT PLACEMENT DEVICE

(71) Applicant: DENTSPLY SIRONA INC., York, PA (US)

(72) Inventors: Frank Witte, Berlin (DE); Friedrich Riemeier, Berlin (DE); Rohit Sachdeva, Plano, TX (US); Phillip Getto, Dallas, TX (US)

(73) Assignee: DENTSPLY SIRONA INC., York, PA (US)

( * ) Notice: Subject to any disclaimer, the term of this patent is extended or adjusted under 35 U.S.C. 154(b) by 246 days.

(21) Appl. No.: 16/953,465

(22) Filed: Nov. 20, 2020

(65) Prior Publication Data

US 2021/0068928 A1   Mar. 11, 2021

Related U.S. Application Data

(62) Division of application No. 15/804,048, filed on Nov. 6, 2017, now Pat. No. 10,869,738, which is a division of application No. 14/795,764, filed on Jul. 9, 2015, now abandoned.

(60) Provisional application No. 62/061,130, filed on Oct. 7, 2014.

(51) Int. Cl.
    *A61C 7/14*    (2006.01)
    *A61C 7/00*    (2006.01)
    *B33Y 80/00*   (2015.01)

(52) U.S. Cl.
    CPC .............. *A61C 7/146* (2013.01); *A61C 7/002* (2013.01); *B33Y 80/00* (2014.12)

(58) Field of Classification Search
    CPC ................................ A61C 7/146; A61C 7/002
    See application file for complete search history.

(56) References Cited

U.S. PATENT DOCUMENTS

| | | | | |
|---|---|---|---|---|
| 3,521,355 | A * | 7/1970 | Pearlman ............... | A61C 7/146 433/8 |
| 4,038,753 | A * | 8/1977 | Klein ..................... | A61C 7/306 433/18 |
| 5,791,896 | A * | 8/1998 | Ipenburg ................. | A61C 7/12 433/24 |
| 5,863,198 | A * | 1/1999 | Doyle .................... | A61C 7/146 433/3 |
| 6,565,355 | B2 * | 5/2003 | Kim ....................... | A61C 7/145 433/3 |

(Continued)

*Primary Examiner* — Ralph A Lewis
(74) *Attorney, Agent, or Firm* — DENTSPLY SIRONA INC.

(57) ABSTRACT

In a preferred embodiment of the disclosure, tooth attachment placement (TAP) device or for assisting a user in placing one or more appliances or attachments on one or more teeth is disclosed. The TAP device comprises single tooth jigs connected through splines. The geometry of the device is automatically designed in the treatment planning unified workstation, thereby generating a digital STL file. Then the device is created from a non-flexible biocompatible material by a 3D printer in accordance with the digital STL file. Appliance, for example, may be a bracket or a bracket shim; and the attachment may be an aligner attachment or a pad. Different embodiments of the TAP device are disclosed. Methods for verifying the accuracy of the placements of the brackets on the teeth using the TAP device are disclosed.

15 Claims, 42 Drawing Sheets

(56) References Cited

U.S. PATENT DOCUMENTS

| | | | | |
|---|---|---|---|---|
| 7,234,934 | B2* | 6/2007 | Rosenberg | A61C 7/146 433/6 |
| 10,052,177 | B2* | 8/2018 | Andreiko | A61C 7/146 |
| 10,869,738 | B2* | 12/2020 | Witte | A61C 7/146 |
| 2010/0216083 | A1* | 8/2010 | Grobbee | A61C 7/146 700/98 |
| 2014/0255864 | A1* | 9/2014 | Maehata | A61C 7/146 433/3 |
| 2017/0325911 | A1* | 11/2017 | Marshall | A61C 7/146 |
| 2018/0318046 | A1* | 11/2018 | Lee | A61C 7/146 |
| 2019/0142551 | A1* | 5/2019 | Dickenson | B33Y 50/00 433/3 |

\* cited by examiner

TOOTH ATTACHMENT PLACEMENT DEVICE

CROSS-REFERENCE TO RELATED APPLICATIONS

This application is a divisional application of U.S. patent application Ser. No. 15/804,048, filed Nov. 6, 2017, pending, which is a divisional application of U.S. patent application Ser. No. 14/795,764, filed Jul. 9, 2015, pending, which is a non-provisional application corresponding to the provisional application Ser. No. 62/061,130, filed Oct. 7, 2014. This application is related to the U.S. Pat. Nos. 6,554,613, 6,905,337, 6,918,761, 7,013,191, 7,252,509, 7,590,462 and 7,699,606 issued to OraMetrix and their related patent applications, the entire contents of each of these patents and corresponding applications are fully incorporated by reference herein.

BACKGROUND OF THE INVENTION

A. Field

This disclosure relates generally to the field of orthodontics and dentistry. More particularly, the disclosure relates to templates that are applied to teeth and which provide a locating mechanism for a variety of purposes, including localization of treatments on a tooth, and accurately placing brackets, bracket bonding pads, and other orthodontic appliances on teeth.

B. Description of Related Art

In orthodontics, a patient suffering from a malocclusion is typically treated by bonding brackets to the surface of the patient's teeth. The brackets have slots for receiving an archwire. The bracket-archwire interaction governs forces applied to the teeth and defines the desired direction of tooth movement. Typically, the bends in the wire are made manually by the orthodontist. During the course of treatment, the movement of the teeth is monitored. Corrections to the bracket position and/or wire shape are made manually by the orthodontist.

In conventional orthodontics, accurate placement of the brackets on the teeth is important to ensure that the tooth is moved over the course of treatment to the desired finish position. The proper location of brackets on the teeth is part of treatment planning for the patient performed by the orthodontist. Desired bracket position can be determined in a variety of ways, including mathematical calculation (see Lemchen, U.S. patent RE 35,169 and Andreiko et al., U.S. Pat. Nos. 5,431,562 and 5,683,243), using interactive orthodontic treatment planning software (see published PCT application of OraMetrix, Inc., WO 01/80761), using wax set-ups from a model of the malocclusion, and by the orthodontist mentally visualizing the bracket placement on the tooth.

Once the desired bracket position is determined using any of these means, the actual placement of the bracket on the teeth can be carried out directly by bonding the bracket to the teeth, either with or without some bracket placement aids. Bracket placement aids, in the form of customized machined bracket placement jigs and thermoplastic bracket transfer trays, are known in the art. See the above-cited patents to Andreiko, Cohen et al. U.S. Pat. No. 3,738,005 and Cleary et al., U.S. Pat. No. 6,123,544.

The present disclosure provides device or tooth templates for a variety of possible purposes, including precisely locating brackets on teeth. The devices or templates represent a less costly, easier to use approach to bracket placement than the jigs and transfer trays described above. Moreover, the manufacturing of the templates, at least in some embodiments, does not require any specialized equipment such as milling machines or stereolithography machines. The templates can also be used for a variety of other dental uses besides the bracket placement, including locating mechanisms for specific procedures on teeth such as varnishing and etching, treatment of cavities, root canals and other treatments and placement of attachments for aligners or pads on the teeth.

SUMMARY OF THE INVENTION

In a preferred embodiment of the disclosure, tooth attachment placement (TAP) device for assisting a user in placing one or more appliances or attachments on one or more teeth is disclosed. The TAP device comprises single tooth jigs connected through splines or other elements of different configuration(s). The geometry of the TAP device is automatically designed in the treatment planning unified workstation, thereby generating a digital file of the TAP device design, preferably in the STL format, or in any other suitable format such as STEP. Then, the TAP device is created preferably from a non-flexible biocompatible material by a generative manufacturing apparatus, such as a 3D printer, in accordance with the digital file of the TAP device design. One skilled in the art would appreciate that the TAP device can also be created from semi flexible or flexible material, or from a hybrid combination of flexible and non-flexible materials. Appliance, for example, may be a bracket or a bracket shim; and the attachment may be an aligner attachment or a pad. A bracket shim is an intermediary structure with opposed surfaces, one facing the tooth and the other facing the bracket base, providing a shim between the tooth surface and the bracket base to accurately position the bracket, and in particular the slot of the bracket, in three-dimensional space. The device or the template comprises single tooth jigs connected through splines. The device is produced in labial and lingual versions and provides better fit compared to conventional deep-drawn Indirect Bonding Trays (IDBs). Bonding of all brackets can be achieved in one step. If needed, the device can be cut into segments in certain malocclusions. Additionally, re-bonding of a single tooth can be done by using only one cut out jig. Jigs can be included for later bonding of teeth that cannot be bonded initially (because the tooth may not be erupted, or require rotation, or for any other treatment reasons). The geometry of the device is automatically designed in the treatment planning workstation, and does not require any manual interaction of an operator to generate the STL File for producing the device from a biocompatible material, which is not flexible, using a 3D printer. The device is produced at a very reasonable cost.

In one embodiment, the jig designed to hold the appliance (or the attachment) has one or more marks indicating the location and orientation of where the appliance is to be placed on the at least one tooth. The device or the template, in some embodiments, is temporarily adhered to the surface of the tooth. In use, after the device or template is generated, the user removes the mark indicating the location of the appliance, creating a void in the template at that location. Alternatively, the void can be formed in the template during manufacturing process of the template. The template is then applied to the tooth. The void provides an aperture in the template enabling the user to directly bond a bracket to the tooth surface at that location, or, alternatively the shim. The mark may optionally provide orientation features which assist the user in the proper placement of the bracket on the tooth.

The template can take the form for placing brackets on a plurality of teeth for an upper or lower arch of the patient. Alternatively, the template can take the form of a single tooth template for placing a bracket on a single tooth. Other alternative constructions of the templates are contemplated, such as templates that provide a feature which can be activated after the template is applied to the tooth or teeth to make a physical bracket locating mark on the tooth surface directly.

In another preferred aspect, a method is provided for verifying the accuracy of the placement of an orthodontic template on the teeth of a patient, comprising the steps of: a) creating a design of an orthodontic template through treatment planning using a computer containing a three-dimensional virtual model of the teeth of a patient and the location of virtual appliances on the three-dimensional virtual model; b) generating the orthodontic template using the design of the orthodontic template; indicating the outline of the teeth and marks indicating the position and orientation of the appliance on each tooth; c) applying the template to the surface of the actual teeth of the patient; d) verifying the accuracy of the placement of the template on the actual teeth of the patient using the computer; and e) adjusting the placement of the template on the actual teeth of the patient until the desired or acceptable placement of the template is achieved. In order to verify the accuracy of the placement of the template on the teeth of the patient, an image of the dentition of the patient with the template placed upon the teeth is taken and stored in the computer; then digitally compared with the template design placed on the virtual three-dimensional model of the teeth of the patient. If there is a discrepancy between the actual placement of the template on the teeth and the desired placement of the template, then the actual placement is adjusted until the desired or acceptable placement is achieved. The image of the dentition of the patient with the template placed upon the actual teeth is taken using an in-vivo scanning device or with digital photographs or by other similar means.

In another aspect, a method is provided for placing a bracket on a tooth, comprising the steps of: a) generating a template for positioning a bracket on a tooth, the template comprising a mark indicating the position and orientation of an appliance on the tooth and a void in the template; c) placing the template on the surface of the tooth; d) placing a bracket on the tooth at the location of the void in the template; e) bonding the bracket or bracket shim to the tooth; and f) removing the template. In one possible embodiment, prior to the step of bonding the bracket to the tooth, the orthodontist may use the void in the template as a means for accurately applying a chemical composition, such as an acid or sealant, to the tooth surface, or for placing a mask for laser etching of the tooth surface.

In still another aspect, a template is provided for use in applying a treatment to a tooth. The template is sized and shaped so as to be place able onto at least one tooth of a set of teeth of a patient. The template has a void at the location and orientation of where a treatment is to occur on the at least one tooth. The template has a tooth-facing surface adapted to be adhered to the surface of the tooth in a reference position wherein the void accurately indicates the location of wherein the treatment is to occur. The treatment could be any possible treatments, for example, varnishing, etching, cleaning, locating a dental prosthetics e.g., crown or filling, root canal, or of course bracket placement.

The templates of this disclosure can be used directly on the tooth for direct bonding of the bracket, or they can be used with a model of the teeth and used to fabricate a more conventional indirect bonding bracket placement jig, as discussed in detail below.

In another preferred aspect, a method of making an orthodontic template for a patient for use in assisting a user in placing an appliance on a designated tooth void of an appliance whereas each of a plurality of the remaining teeth has an appliance attached thereto is disclosed. The method comprises the steps of: (a) obtaining a three-dimensional virtual model of a patient comprising a designated tooth void of an appliance and the remaining teeth wherein each of a plurality of the remaining teeth has an appliance attached thereto; (b) storing the three-dimensional virtual model in a computer, the computer having instructions foe treatment planning and a library of virtual appliances; (c) positioning a virtual appliance on the designated tooth through treatment planning using the three-dimensional virtual model, wherein the virtual appliance is selected from the library of virtual appliances; (d) creating a design of an orthodontic template using the positioning of the virtual appliance on the designated tooth using the computer; (e) generating said orthodontic template directly with 3D printing using the design of the orthodontic template; the template indicating the outline of the designated tooth; the template having one or more marks indicating the location and orientation of where the appliance is to be placed on the designated tooth; the template having a tooth-facing surface adapted for positioning on the surface of said designated tooth in a reference position wherein the one or more marks accurately indicate the proper location for said appliance. The method is particularly useful where the designated tooth was previously only partially erupted and therefore unable to receive an appliance. The virtual three-dimensional model is created using images obtained through in-vivo scanning the patient. The images include the patient's teeth as well as existing appliances on the remaining teeth.

These and still other aspects of the disclosure will be more apparent from the following detailed discussion of presently preferred embodiments of the disclosure.

BRIEF DESCRIPTION OF THE DRAWINGS

Presently preferred embodiments of the disclosure are described below in reference to the appended drawings, wherein like reference numerals refer to like elements in the various views, and in which:

FIG. 13 shows the target placement of the brackets on the teeth which will be used to design the TAP device in accordance with the disclosure disclosed herein.

FIG. 15 shows a lingual TAP device. Jig is skipped in this case.

FIG. 16 shows a labial TAP device for a lower jaw, including jigs, splines and patient identifier.

FIG. 17 shows a labial TAP device for an upper jaw.

FIG. 18 shows a lingual TAP device placed on the physical model of a jaw. Jig for a tooth is skipped in this case since the tooth is in a rotated position so that the jig cannot be used in this state.

FIG. 19 shows a lingual TAP device placed on the physical model of the jaw as shown in FIG. 18, and additionally with a patient identification link.

FIG. 20 shows the bracket holding geometry of the TAP device including the jig or the holder, the splines, and the bracket.

FIG. 21 shows another view of the bracket holding geometry of the TAP device shown in FIG. 20 including the bracket base.

FIG. 22 shows stabilizing the TAP device by closing the teeth.

FIG. 23 shows another example of stabilizing the TAP device by closing the teeth.

FIG. 24 shows another example of stabilizing the TAP device by closing the teeth.

FIG. 25 shows a section of the TAP device showing side view of a counter shaped slot.

FIG. 26 shows the sane section of the TAP device of FIG. 25, showing front view of the counter shaped slot.

FIG. 27 shows a section of the TAP device showing hollow tubes.

FIG. 28 shows a section of the TAP device showing an example of the distance between the bracket surface and the tooth surface.

FIG. 29 shows a section of the TAP device showing another example that there is no distance between the bracket surface and the tooth surface.

FIG. 30 shows a section of the TAP device showing a snap fit.

FIG. 31 shows a section of the TAP device showing an example of the form-fitting elements.

FIG. 32 shows another embodiment of the disclosure showing a design of another type of TAP device based upon the brackets placed on the patient's malocclusion.

FIGS. 38A and 38B display how to position bracket holder.

FIG. 38C displays how to place Jig on the tooth.

FIG. 38D displays how to fix the Jig before light hardening.

FIGS. 38E and 38F display how to remove cap.

FIG. 38G displays how to open the bracket door.

FIG. 38H displays how to remove the metal bracket holder.

DETAILED DESCRIPTION OF THE INVENTION

Figure 1:
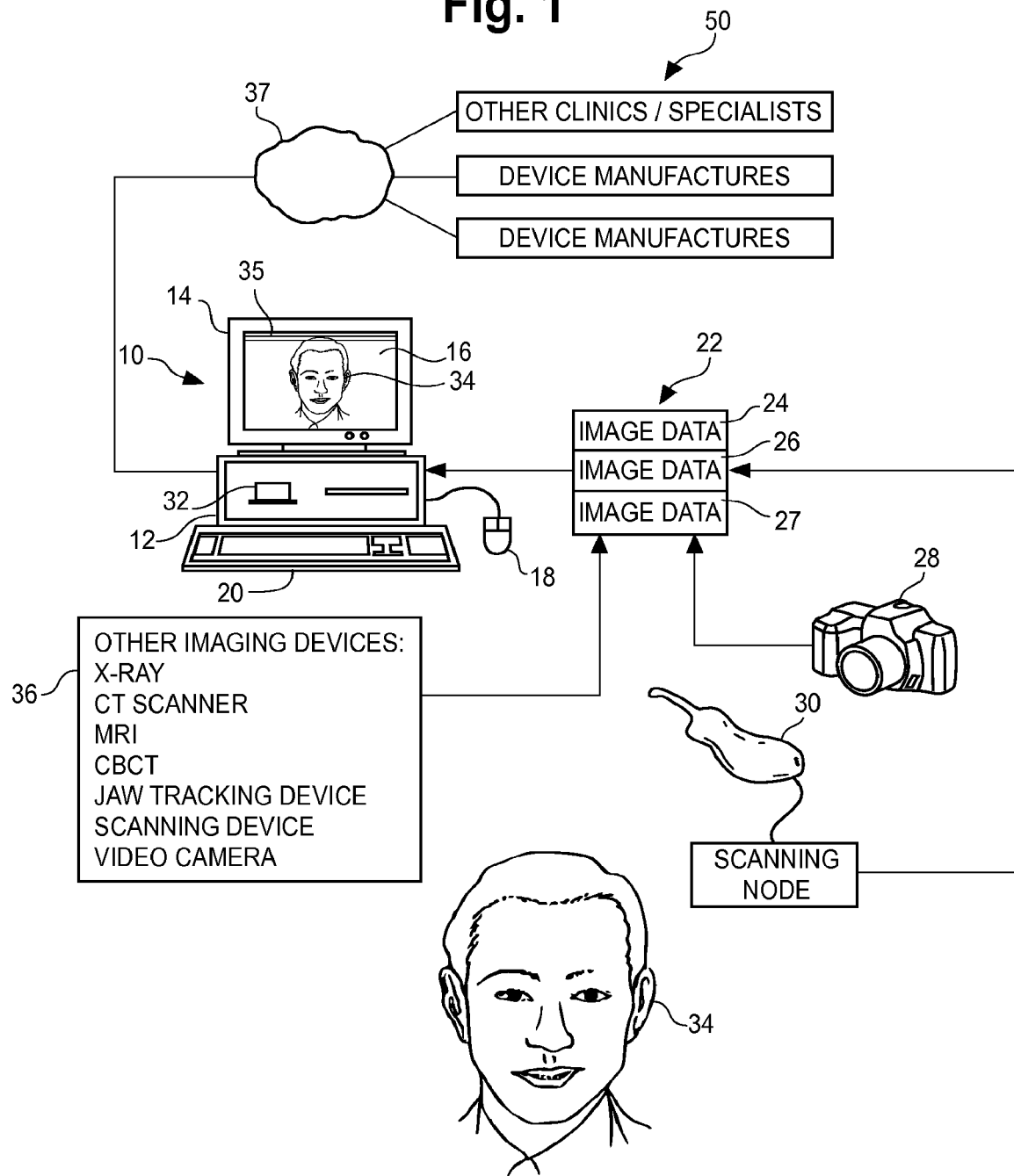
FIG. 1 is block diagram of a system for creating a three-dimensional virtual patient model and for diagnosis and planning treatment of the patient.

In a preferred embodiment of the disclosure, tooth attachment placement (TAP) device or for assisting a user in placing one or more appliances or attachments on one or more teeth is disclosed. The TAP device comprises single tooth jigs connected through splines or other elements of different configuration(s). The geometry of the TAP device is automatically designed in the treatment planning unified workstation, thereby generating a digital file of the TAP device design, preferably in the STL format, or in any other suitable format including STEP or VDA. Then the TAP device is created from a non-flexible biocompatible material by a generative manufacturing apparatus, such as a 3D printer in accordance with the digital file of the TAP device design. One skilled in the art would appreciate that the TAP device can also be created from semi flexible or flexible material, or from a hybrid combination of flexible and non-flexible materials. Appliance, for example, may be a bracket or a bracket shim; and the attachment may be an aligner attachment or a pad.

Before describing the features of this disclosure in detail, an overview of the unified workstation will be set forth initially. The workstation provides software features that create two dimensional and/or three-dimensional virtual model of a patient on a computer, which can be used for purposes of communication, diagnosis, treatment planning and designing orthodontic devices or templates for assisting users in placing one or more appliances or attachments on one or more teeth, or other orthodontic customized appliances.

The essence of the unified workstation described herein is the ability to capture images from various sources that provide volumetric images, surface images that are 3-D or 2-D in nature, and may be static or dynamic, such as from CBCT, CAT, MRI, fMRI, ultrasound device, cameras that provide still photos, white light and laser based surface scanners, video cameras providing video images, tracking devices and digital cameras. Images from these sources are combined as needed to create a unified simulation model of the craniofacial and dental facial complex, for facilitating diagnosis, communication, treatment planning, and design of appliances for treating craniofacial and dentofacial problems. With these images a composite structure of the face can be constructed with dynamic or static behavioral properties. One can also track function or jaw movement and simulate the functional movements, e.g., smile movement of the lower jaw etc.

The global positioning of the entire face with respect to its surroundings can be set by the user for planning purposes. In addition, the relative position of each of the structural elements, such as the upper jaw and its teeth when captured independently, can be oriented with respect to any other structure such as the soft tissue face by using specific anatomical land marks or user defined reference planes, either in 2-D or 3-D space. Furthermore, the relationship of the lower jaw and its accompanying teeth can be registered with respect to the upper jaw using a combination of registration techniques. For instance, the bite registration can be recorded by taking an intraoral surface scan of the teeth together and using it as a template to register the relationship of the upper jaw and the lower jaw from a CBCT volumetric scan.

Most importantly from volumetric data, one can extract three dimensional structural data which may include crowns and roots of teeth, bone, soft tissue, e.g., gingiva and facial soft tissue and appliances attached to any of these structures, such as orthodontic brackets, implants, etc. Each of these structural elements can be independently manipulated in three-dimensional space to construct a treatment plan, and design the appropriate device for correction of a problem. Furthermore, the interdependencies of the treatment between these various structural components can be modeled to design a holistic treatment plan. Specific relationships between the various structural components can be defined by choosing an appropriate reference plane and capturing the spatial relationships between specific structures. The treatment design may include repositioning, restoring, replacing of any of the structural elements in 2-D or 3-D space. Also function can be simulated or modeled based upon captured data to achieve the desired goals, e.g., the teeth with their roots can be appropriately positioned in the bone to withstand the stresses of jaw movement or the position of the jaw joint, i.e., the condyle is in harmony with the position of the teeth to prevent any source of dysfunction or breakdown of the structural elements. Mechanical analysis, such as finite element method, may also be used to better understand the nature of stresses and strains imposed on the structural elements to design better treatment. All changes may be measured with respect to defined planes of reference to provide numerical output to design a variety of customised treatment devices, such as orthodontic brackets, orthodontic archwires, surgical bite splints, surgical fixation plates, implants, condylar prosthesis, bone screws, periodontal stents, mouth guards, bite plates, removable orthodontic appliances, crowns, bridges, dentures, partial dentures, obturators, temporary anchorage devices from either natural or synthetic substances using generative manufacturing apparatus, such as SLA or milling or robotic manufacturing. Any type of dental, orthodontic, restorative, prosthodontic or surgical device which may be tissue borne, dental borne, osseous borne, can be designed in combination, or singularly in serial or in parallel, e.g., indirect bonding trays that allow bonding of brackets, and are also designed to guide implant insertion. Furthermore, if the patient requires surgery, splints, fixation plates, boney screws may all be designed and manufactured simultaneously. The numerical output of the treatment plan can be used to drive navigational systems for performing any procedure. Simulations can be used to train and build skills or examine proficiency. The numerical output of the treatment design can be used to drive robots to perform surgical procedures. Furthermore, this output can be used to create a solid model representation of the treatment plan using generative manufacturing techniques or milling techniques.

Template data or normative data stored in memory can be used to plan any of the structural changes or design of the devices. In addition, reference data from the non-affected structural elements may be used as templates to provide design parameters to plan and correct the affected side.

One can also replace or remove any of the structures to achieve the desired goal, e.g., extraction of teeth, root amputation, sinus lift, veneers, inter-proximal reduction, etc. The codependency of movement of one object and its effect on another can also be simulated for all three tissue types, e.g., when the tooth moves how does it affect the gum soft tissue, when the tooth moves where does the root move in reference to the bone, or how does the bone change, how does the face change when the bones move. All types of planning can be executed by different modalities or professionals in an interactive manner asynchronously or synchronously.

In summary, the unified workstation provides the ability to plan crowns with roots thereby optimizing the planning by changing the root position so that the crown planned is designed such that axial forces are transmitted to the roots to add to the stability of the crown minimizing aberrant forces that can lead to root fracture, crown fracture, and breakdown of the periodontium or bone. Similarly, for surgical patients one can plan root positions so that the surgeon can cut between the roots and prevent damage besides planning the movement of the bones. Similarly for implants, one can move the roots in a desirable location so that the implant when inserted doesn't damage the roots. The user can also size the implants correctly so that they don't encroach on root space. All this planning would be impossible if the roots were not made separate objects that could move. Finally, one can move the roots preferentially to create bone. As one extrudes a root one can create bone. Similarly one can change the gum tissue architecture by moving roots and for orthodontic movement one can avoid moving roots where there is no bone or selectively move teeth to prevent root collision or move roots away from areas where there is lack of bone into the areas where there is bone as one plans to move them towards their final destination. Again, not only can one plan tooth movement but bone movement and soft tissue gum and face as well to achieve the goals. One can, alter the spatial position of all the objects which are extracted, change their shape form and volume to restore and or reconstruct. One can sculpt or remove selectively any region gum soft issue bone dentition. Although one can use a fusion technique, the preference is to extract the data from the CBCT for bone and dentition with roots at a minimum. One can take partial intramural scans where distortion is expected, e.g., large metal crowns or fillings, or one can scan an impression in those areas or plaster limited to the region of interest.

The images of the roots can be taken with CBCT and affixed to crowns taken by scanning intramural impressions or models. The preferred process does not require fusing a model of the dentition into the crank facial structure. All needed information can be captured in one shot and extract individual features. The unified workstation captures the dental and osseous and soft tissue as one and segregates them into individual components for planning treatment. The optimization of the treatment plan can be achieved by using different approaches, e. g., correcting crowding by minimizing tooth movement and planning veneers or minimising tooth preparation for veneer construction by positioning the teeth appropriately. This can be said for any structure and the decision can be driven by the patients need, time constraints, cost risk benefit, skill of operator, etc.

Many of the details and computer user interface tools which a practitioner may use in adjusting tooth position, designing appliance shape and location, managing space between teeth, and arriving at a finish tooth position using interaction with a computer storing and displaying a virtual model of teeth are set forth in the prior application Ser. No. 09/834,412 filed Apr. 13, 2001, and in published OraMetrix patent application WO 01/80761, the contents of which are incorporated by reference herein.

General Description

A unified workstation environment and computer system for diagnosis, treatment p arming and delivery of therapeutics, especially adapted for treatment of craniofacial structures, is described below. In one possible example, the system is particularly useful in diagnosis and planning treatment of an orthodontic patient with other craniofacial disorders or conditions requiring surgery, prosthodontic treatment, restorative treatment, etc.

As depicted in FIG. 1, the overall system 50 includes a general-purpose computer system 10 having a processor (CPU 12) and a user interface 14, including screen display 16, mouse 18 and keyboard 20. The system is useful for planning treatment for a patient 34.

The system 50 includes a computer storage medium or memory 22 accessible to the general-purpose computer system 10. The memory 22, such as a hard disk memory or attached peripheral devices, stores two or more sets of digital data representing patient craniofacial image information. These sets include at least a first set of digital data 24 representing patient craniofacial image information obtained from a first imaging device and a second set of digital data 26 representing patient craniofacial image information obtained from a second image device different from the first image device. The first and second sets of data represent, at least in part, common craniofacial anatomical structures of the patient. At least one of the first and second sets of digital data normally would include data representing the external visual appearance or surface configuration of the face of the patient.

In a representative and non-limiting example of the data sets, the first data set 24 could be a set of two dimensional color photographs of the face and head of the patient obtained via a color digital camera 28, and the second data set is three-dimensional image information of the patient's teeth, acquired via a suitable scanner 30, such as a hand-held optical 3D scanner, or other type of scanner. The memory 22 may also store other sets 27 of digital image data, including digitized X-rays, MRI or ultrasound images, CT scanner, CBCT scanner, jaw tracking device, scanning device, video camera, etc., from other imaging devices 36. The other imaging devices need not be located at the location or site of the workstation system 50. Rather, the imaging of the patient 34 with one or other imaging devices 36 could be performed in a remotely located clinic or hospital, in which case the image data is obtained by the workstation 50 over the Internet 37 or some other communications medium, and stored in the memory 22.

The system 50 further includes a set of computer instructions stored on a machine-readable storage medium. The instructions may be stored in the memory 22 accessible to the general-purpose computer system 10. The machine-readable medium storing the instructions may alternatively be a hard disk memory 32 for the computer system 10, external memory devices, or may be resident on a file server on a network connected to the computer system, the details of which are not important. The set of instructions, described in more detail below, comprise instructions for causing the general computer system 10 to perform several functions related to the generation and use of the virtual patient model in diagnostics, therapeutics and treatment planning.

These functions include a function of automatically, and/or with the aid of operator interaction via the user interface 14, superimposing the first set 24 of digital data and the second set 26 of digital data so as to provide a composite, combined digital representation of the craniofacial anatomical structures in a common coordinate system. This composite, combined digital representation is referred to herein occasionally as the "virtual patient model," shown on the display 16 of FIG. 1 as a digital model of the patient 34. Preferably, one of the sets 24, 26 of data includes photographic image data of the patient's face, teeth and head, obtained with the color digital camera 28. The other set of data could be intra-oral 3D scan data obtained from the hand-held scanner 30, CT scan data, X-Ray data, MRI, etc. In the example of FIG. 1, the hand-held scanner 30 acquires a series of images containing 3D information and this information is used to generate a 3D model in the scanning node 31, in accordance with the teachings of the published PCT application of OraMetrix, PCT publication no. WO 01/80761, the contents of which are incorporated by reference herein. Additional data sets are possible, and may be preferred in most embodiments. For example the virtual patient model could be created by a superposition of the following data sets: intra-oral scan of the patient's teeth, gums, and associated tissues, X-Ray, CT scan, intra-oral color photographs of the teeth to add true color (texture) to the 3D teeth models, and color photographs of the face, that are combined in the computer to form a 3D morph-able face model. These data sets are superimposed with each other, with appropriate scaling as necessary to place them in registry with each other and at the same scale. The resulting representation can be stored as a 3D point cloud representing not only the surface on the patient but also interior structures, such as tooth roots, bone, and other structures. In one possible embodiment, the hand-held in-vivo scanning device is used which also incorporates a color CCD camera to capture either individual images or video.

The software instructions further include a set of functions or routines that cause the user interface 16 to display the composite, combined digital three-dimensional representation of craniofacial anatomical structures to a user of the system. In a representative embodiment, computer-aided design (CAD)-type software tools are used to display the model to the user and provide the user with tools for viewing and studying the model. Preferably, the model is cable of being viewed in any orientation. Tools are provided for showing slices or sections through the model at arbitrary, user defined planes. Alternatively, the composite digital representation may be printed out on a printer or otherwise provided to the user in a visual form.

The software instructions further include instructions that, when executed, provide the user with tools on the user interface 14 for visually studying, on the user interface, the interaction of the craniofacial anatomical structures and their relationship to the external, visual appearance of the patient. For example, the tools include tools for simulating changes in the anatomical position or shape of the craniofacial anatomical structures, e.g., teeth, jaw, bone or soft tissue structure, and their effect on the external, visual appearance of the patient. The preferred aspects of the software tools include tools for manipulating various parameters such as the age of the patient; the position, orientation, color and texture of the teeth; reflectivity and ambient conditions of light and its effect on visual appearance. The elements of the craniofacial and dental complex can be analyzed quickly in either static format (i.e., no movement of the anatomical structures relative to each other) or in an dynamic format (i.e., during movement of anatomical structures relative to each other, such as chewing, occlusion, growth, etc.). To facilitate such modeling and simulations, teeth may be modeled as independent, individually moveable 3-dimensional virtual objects, using the techniques described in the above-referenced OraMetrix published PCT application, WO 01/80761.

The workstation environment provided by this disclosure provides a powerful system and for purposes of diagnosis, treatment planning and delivery of therapeutics. For example, the effect of jaw and skull movement on the patient's face and smile can be studied. Similarly, the model can be manipulated to arrive at the patient's desired feature and smile. From this model, and more particularly, from the location and position of individual anatomical structures (e.g., individual tooth positions and orientation, shape of arch and position of upper and lower arches relative to each other), it is possible to automatically back solve for or derive the jaw, tooth, bone and/or soft tissue corrections that must be applied to the patient's initial, pre-treatment position to provide the desired result. This leads directly to a patient treatment plan.

These simulation tools, in a preferred embodiment, comprise user-friendly and intuitive icons 35 that are activated by a mouse or keyboard on the user interface of the computer system 10. When these icons are activated, the software instruction provide pop-up, menu, or other types screens that enable a user to navigate through particular tasks to highlight and select individual anatomical features, change their positions relative to other structures, and simulate movement of the jaws (chewing or occlusion). Examples of the types of navigational tools, icons and treatment planning tools for a computer user interface that may be useful in this process and provide a point of departure for further types of displays useful in this disclosure are described in the patent application of Rudger Rubbert et al., Ser. No. 09/835,039 filed Apr. 13, 2001, the contents of which are incorporated by reference herein.

The virtual patient model, or some portion thereof, such as data describing a three-dimensional model of the teeth in initial and target or treatment positions, is useful information for generating customized orthodontic appliances for treatment of the patient. The position of the teeth in the initial and desired positions can be used to generate a set of customized brackets, and customized flat planar archwire, and customized bracket placement jigs as disclosed herein. Alternatively, the initial and final tooth positions can be used to derive data sets representing intermediate tooth positions, which are used to fabricate transparent aligning shells for moving teeth to the final position, as described in the above-referenced Chisti et al. patents. The data can also be used to place brackets and design a customized archwire as described in the previously cited application Ser. No. 09/835,039.

To facilitate sharing of the virtual patient model among specialists and device manufacturers, the system 50 includes software routines and appropriate hardware devices for transmitting the virtual patient model or some subset thereof over a computer network. The system's software instructions are preferably integrated with a patient management program having a scheduling feature for scheduling appointments for the patient. The patient management program provides a flexible scheduling of patient appointments based on progress of treatment of the craniofacial anatomical structures. The progress of treatment can be quantified. The progress of treatment can be monitored by periodically obtaining updated three-dimensional information regarding the progress of treatment of the craniofacial features of the patient, such as by obtaining updated scans of the patient and comparison of the resulting 3D model with the original 3D model of the patient prior to initiation of treatment.

Thus, it is contemplated that system described herein provides a set of tools and data acquisition and processing subsystems that together provides a flexible, open platform or portal to a variety of possible therapies and treatment modalities, depending on the preference of the patient and the practitioner. For example, a practitioner viewing the model and using the treatment planning tools may determine that a patient may benefit from a combination of customized orthodontic brackets and wires and removable aligning devices. Data from the virtual patient models is provided to diverse manufacturers for coordinated preparation of customized appliances. Moreover, the virtual patient model and powerful tools described herein provide a means by which the complete picture of the patient can be shared with other specialists (e.g., dentists, maxilla-facial or oral surgeons, cosmetic surgeons, other orthodontists) greatly enhancing the ability of diverse specialists to coordinate and apply a diverse range of treatments to achieve a desired outcome for the patient. In particular, the overlay or superposition of a variety of image information, including 2D X-Ray, 3D teeth image data, photographic data, CT scan data, and other data, and the ability to toggle back and forth between these views and simulate changes in position or shape of craniofacial structures, and the ability to share this virtual patient model across existing computer networks to other specialists and device manufacturers, allows the entire treatment of the patient to be simulated and modeled in a computer. Furthermore, the expected results can be displayed beforehand to the patient and changes made depending on the patient input.

Treatment Planning

Various treatment planning steps are explained through FIGS. 2-13.

Figure 2:
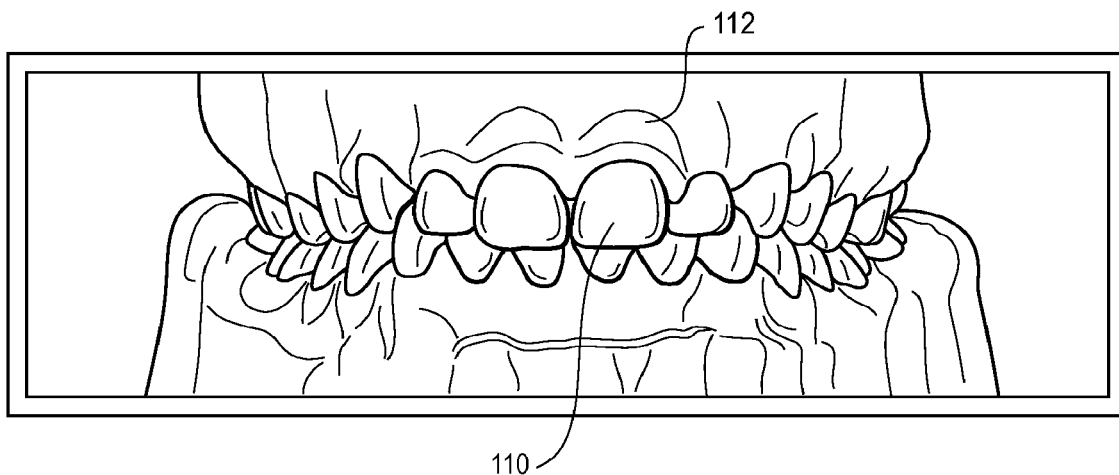
FIG. 2 shows the in-vivo scanned digital dentition model of a patient with teeth and gingiva in the malocclusion state.

FIG. 2 shows the in-vivo scanned digital dentition model of a patient with teeth 110 and gingiva 112 in the malocclusion state. The in-vivo scanning is performed using a handheld, white light scanner. Alternately, the scanning can be done through other scanning devices including a monochrome light scanner or a laser scanner. Also, a similar model can be obtained through scanning an impression of the dentition or a physical model of the dentition created from the impression.

Figure 3:
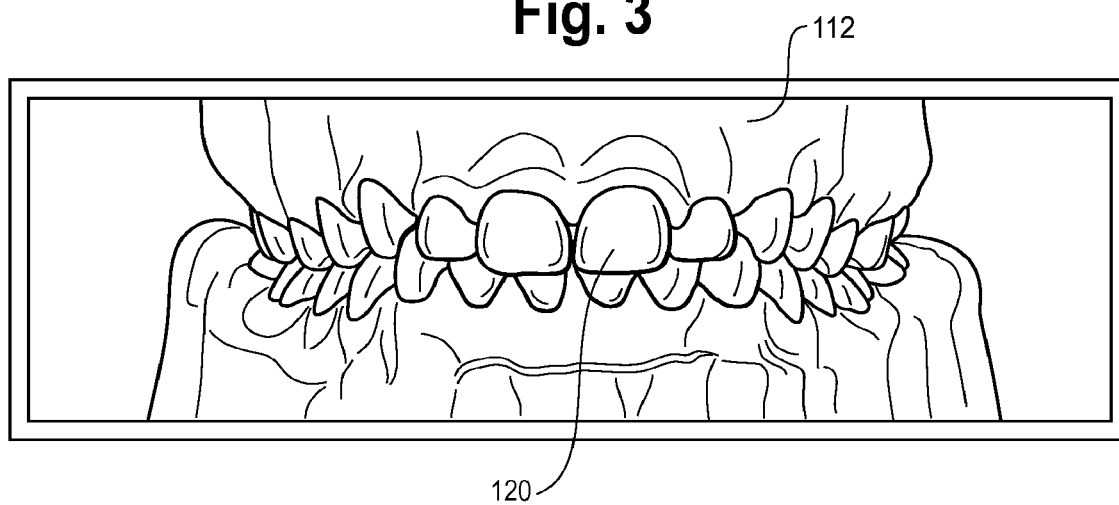
FIG. 3 shows the digital model of the patient in FIG. 2 with teeth and gingiva wherein the teeth are set-up in a target state using the treatment planning instructions provided in the system of FIG. 1.

FIG. 3 shows the digital model of the patient in FIG. 2 with teeth and gingiva 112 wherein the teeth 120 are set-up in a target state using the treatment planning instructions provided in the system of FIG. 1. This can be achieved through treatment planning simulations to realize the target set-up. The target set-up may be the final desired state or an intermediate state depending on the treatment plan chosen for the patient.

Alternately, the treatment planning can be done using the dentition models without gingiva, as explained in FIGS. 4A, 4B, 5A, 5B and 6.

Figure 4A:
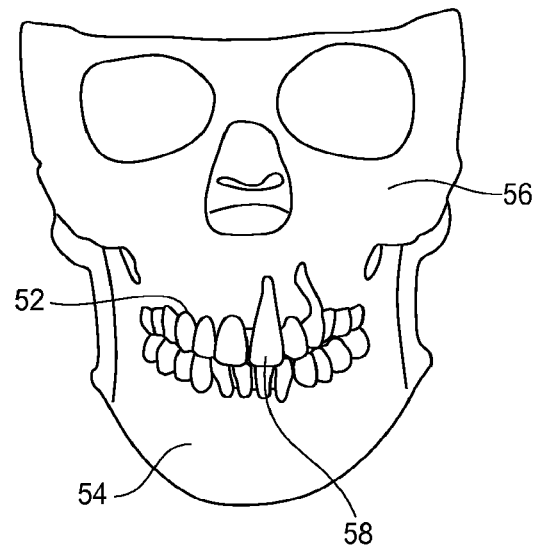
FIG. 4A shows front view of the upper jaw and lower jaw and facial bone with modeled teeth, all obtained from the volume scan of the patient.

FIG. 4A shows front view of the upper jaw 52 and lower jaw 54 and facial bone 56 with modeled teeth 58, all obtained from the volume scan of the patient.

Figure 4B:
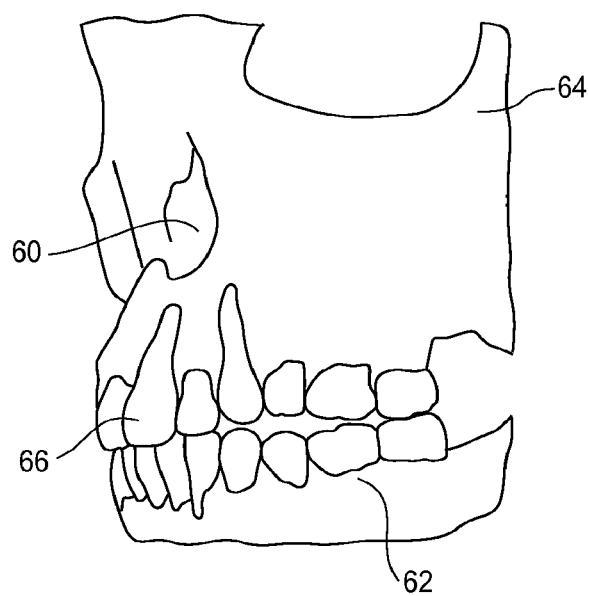
FIG. 4B shows left bucal view of the upper jaw and lower jaw and facial bone with modeled teeth, all obtained from the volume scan of the patient.

FIG. 4B shows left bucal view of the upper jaw 60 and lower jaw 62 and facial bone 64 with modeled teeth 66, all obtained from the volume scan of the patient.

Figure 5A:
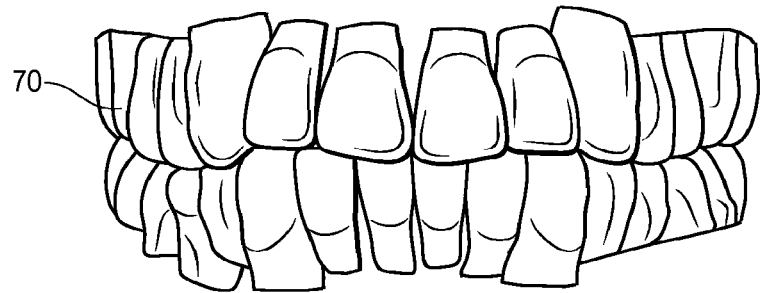
FIG. 5A shows modeling of teeth obtained from surface scanning of the dentition of a patient. While tooth crowns are displayed in the model, tooth roots and jaw bones are missing.

FIG. 5A shows modeling of teeth obtained from surface scanning of the dentition of a patient. While tooth crowns 70 are displayed in the model, tooth roots and jaw bones are missing.

Figure 5B:
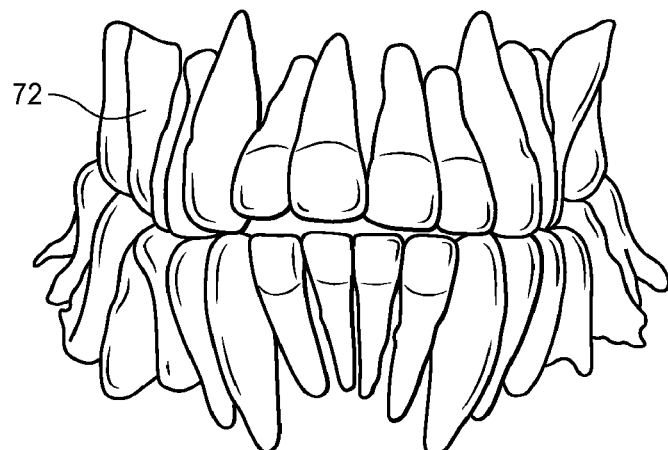
FIG. 5B shows teeth with roots in malocclusion. The roots are obtained through scanning the patient's dentition and bones using a CBCT device and integrating the CBCT digital data with the data obtained through in-vivo scanning.

FIG. 5B shows teeth 72 with roots in malocclusion. The roots are obtained through scanning the patient's dentition and bones using a CBCT device and integrating the CBCT digital data with the data obtained through in-vivo scanning.

Figure 6:
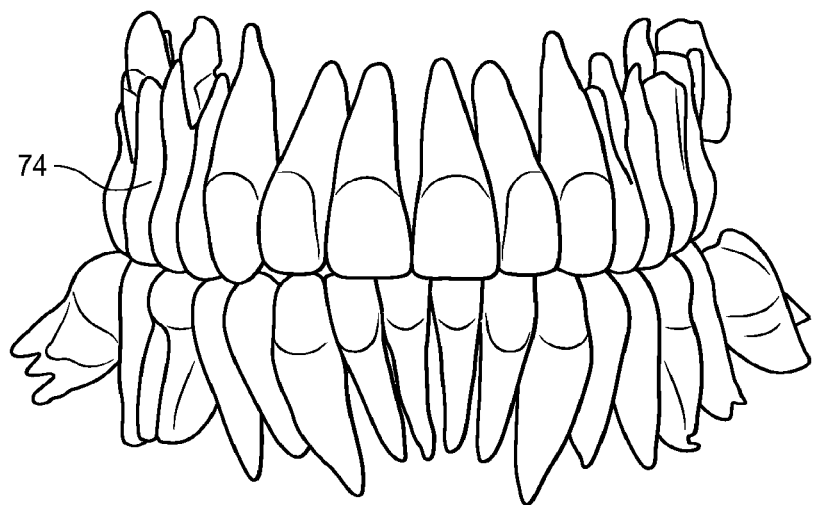
FIG. 6 shows patient's crowns with roots at a target stage.

FIG. 6 shows patient's crowns with roots 74 at a target stage.

FIG. 6 shows the digital model of the patient in FIG. 5B set-up in a target state by taking into account the positions of the roots using the treatment planning instructions provided in the system of FIG. 1. The advantage of this approach is that the root positions are taken into consideration while planning the target set-up thereby avoiding any teeth movements that may not be feasible due to root positions.

Figure 7:
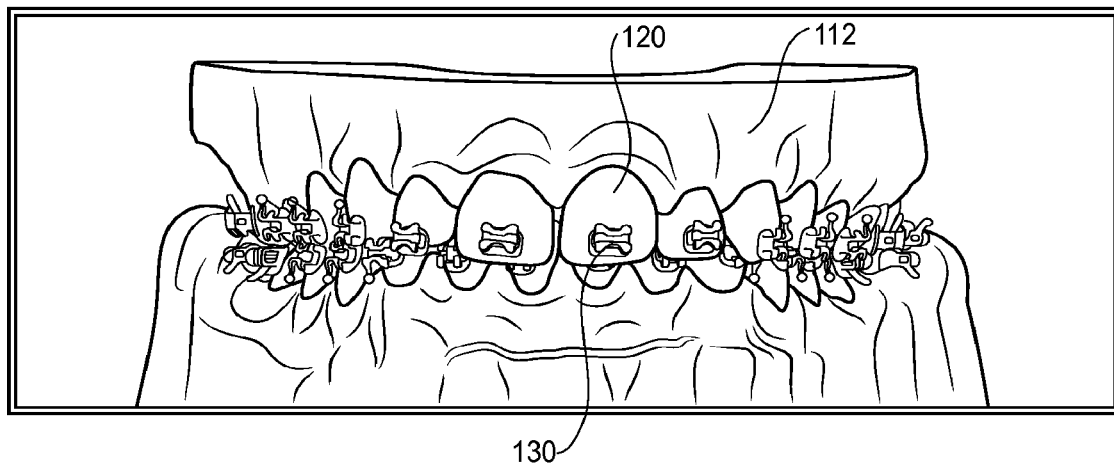
FIG. 7 shows the digital target set-up model of the patient in FIG. 3 with the brackets placed on the teeth. Gingiva is also present in this figure.

FIG. 7 shows the digital target set-up model of the patient in FIG. 3 with the brackets 130 placed on the teeth 120. Gingiva 112 are also present in this figure. The brackets 130 may be automatically selected from a bracket library and automatically placed at desired locations on the teeth by the instructions in the system of FIG. 1. Alternately, the brackets may be selected by an operator and placed at locations selected by the operator. If the brackets are automatically placed by the instructions in the system of FIG. 1, then one or more of them can be selected and moved to a different location by the operator.

Figure 8:
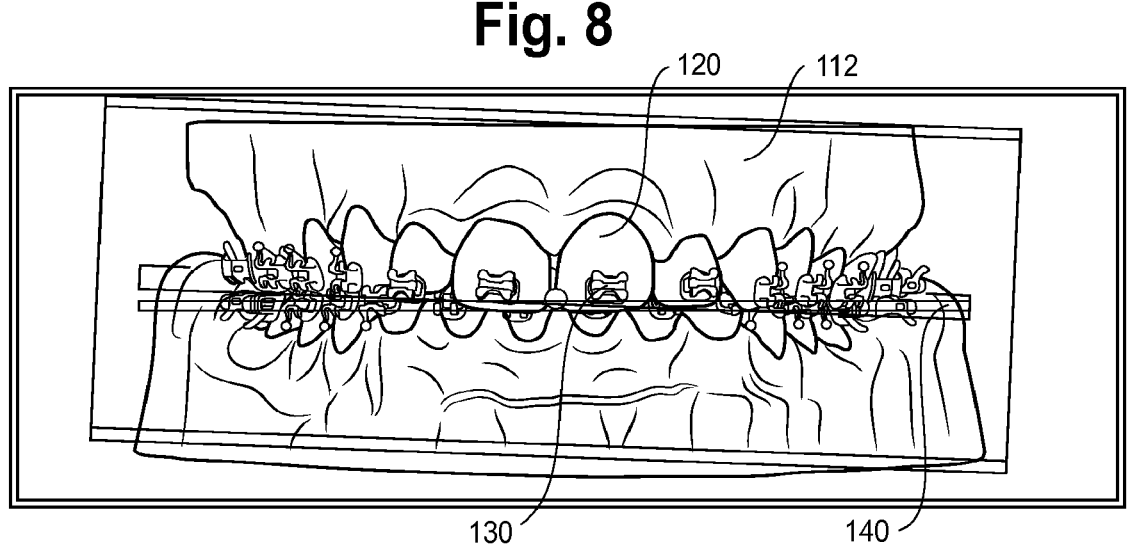
FIG. 8 shows the digital target set-up model of the patient with the brackets placed on the teeth of FIG. 7 with a plane of reference for the brackets. Again, gingiva are also present in this figure.

FIG. 8 shows the digital target set-up model of the patient with the brackets 130 placed on the teeth 120 of FIG. 7 with a plane of reference 140 for the brackets. Again, gingiva 112 is also present in this figure. With the plane of reference, all the brackets can be moved to a different position globally.

Figure 9:
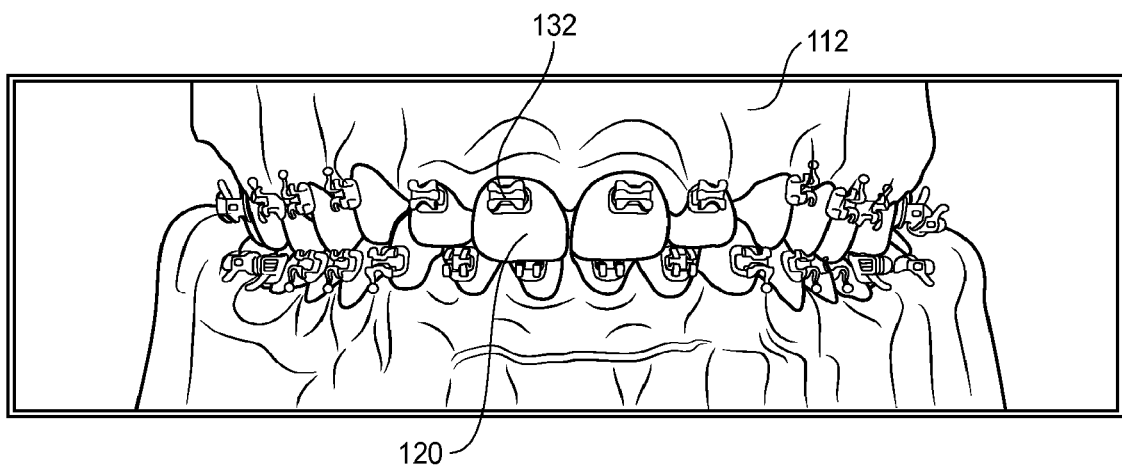
FIG. 9 shows the digital target set-up model of the patient of FIG. 8 with the brackets repositioned by using the plane of reference for the brackets as a guide.

FIG. 9 shows the digital target set-up model of the patient of FIG. 8 with the brackets 132 repositioned by using the plane of reference for the brackets as a guide. Teeth 120 and gingiva 112 are also present in this figure.

Figure 10:
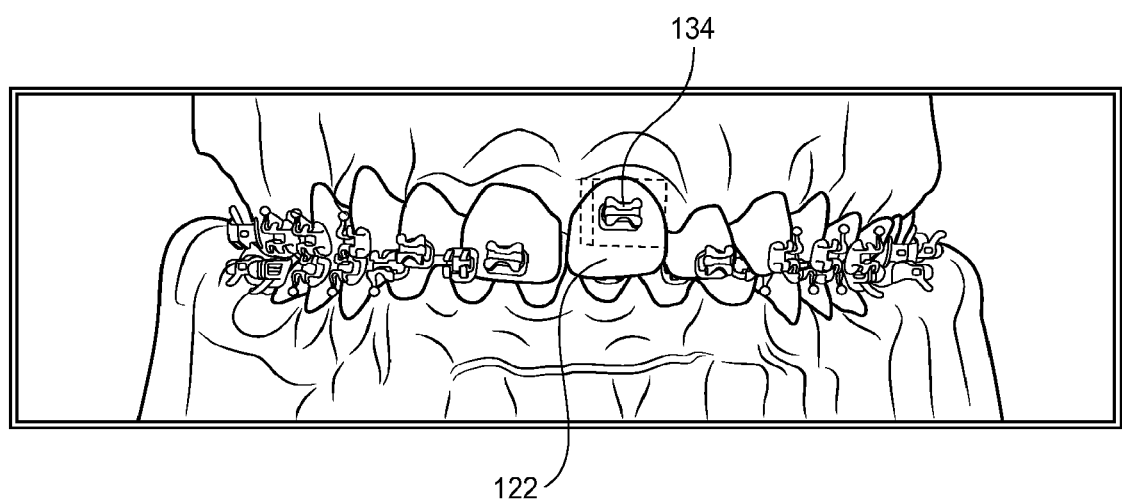
FIG. 10 shows the patient model of FIG. 7 with an individual bracket repositioned as shown on the tooth.

FIG. 10 shows the patient model of FIG. 7 with an individual bracket 134 repositioned as shown on tooth 122. Such repositioning of one or more brackets is done when desired.

Figure 11A:
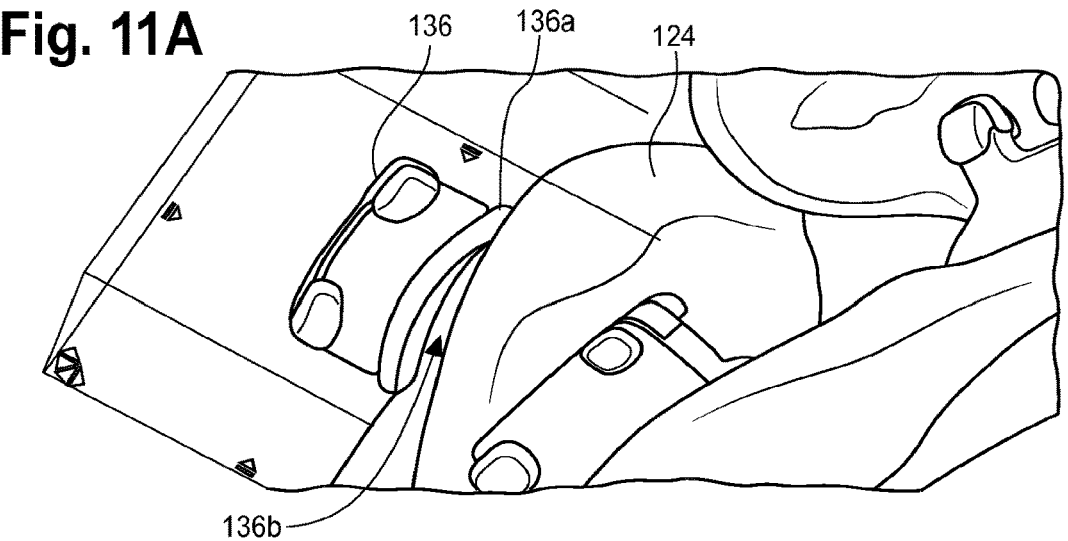
FIGS. 11A, 11B and 11C show examples of bracket positioning on a tooth.
Figure 11B:
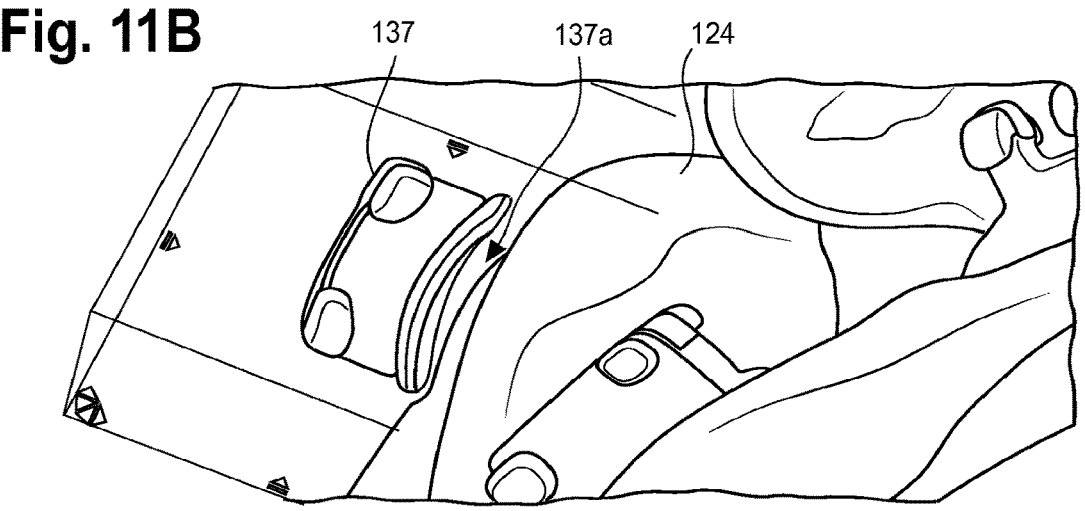
Figure 11C:
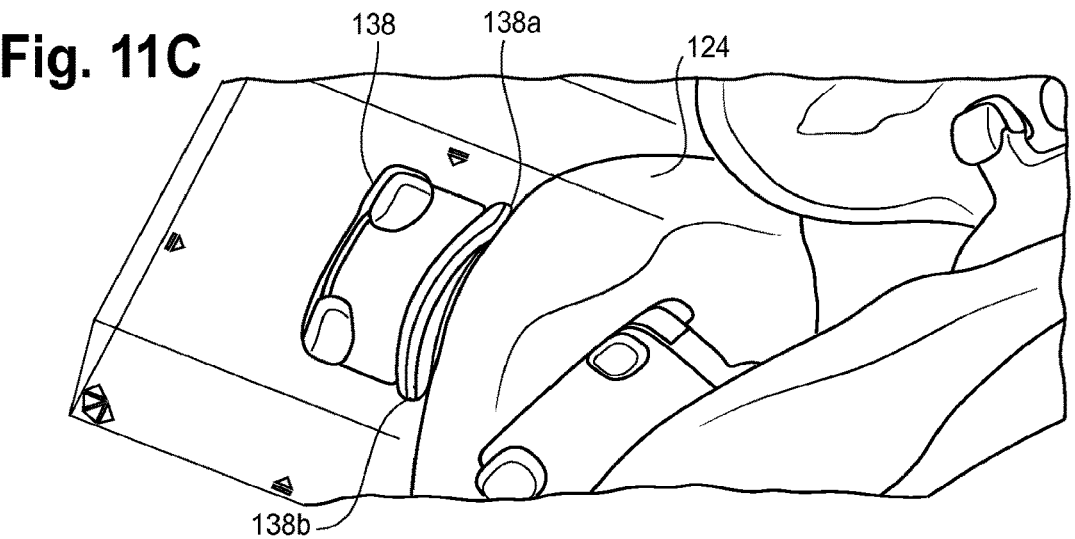

FIGS. 11A, 11B and 11C show examples of bracket positioning on a tooth. FIG. 11A shows the bracket 136 touching at a single point 136a on the surface of the tooth 124 thereby creating a gap 136b between the base of the bracket 136 and the surface of the tooth 124; FIG. 11B shows the bracket 137 not touching the surface of the tooth 124 at all and thereby creating a gap 137a between the base of the bracket 137 and the surface of the tooth 124; and FIG. 11C shows the bracket 138 touching the surface of the tooth 124 at two points 138a and 138b thereby leaving no gap between the base of the bracket 138 and the surface of the tooth 124. The operator can thus modify the positioning of the base of any bracket on the surface of a tooth as desired in order to realize the treatment goals. The shape of the gap between the base of a bracket and the surface of the corresponding tooth dictates the shape of the pad necessary to properly bond the bracket to the tooth.

Figure 12A:
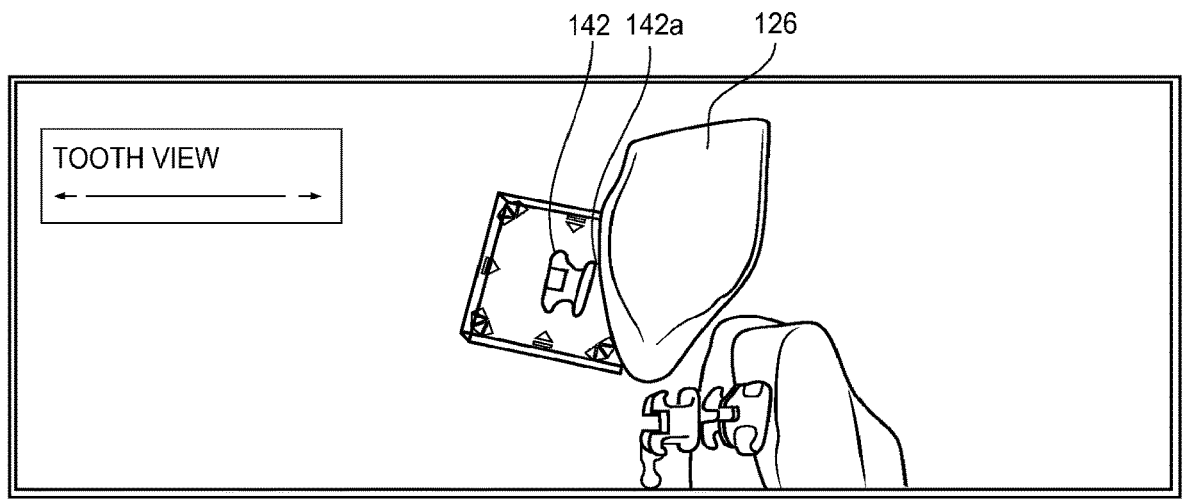
FIGS. 12A and 12B show additional examples of bracket positioning on a tooth.
Figure 12B:
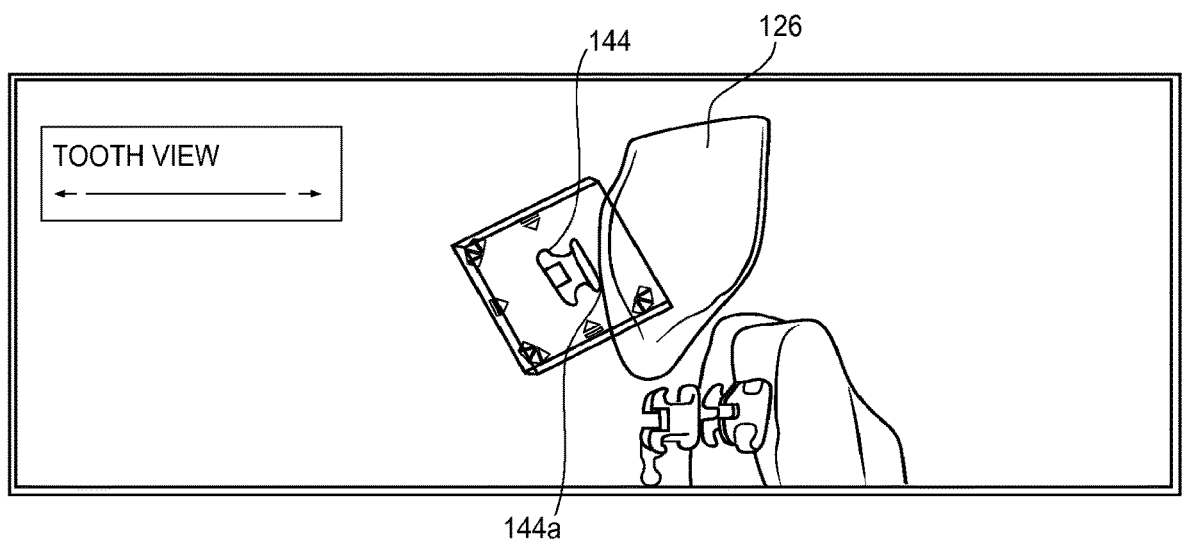

FIGS. 12A and 12B show additional examples of bracket positioning on a tooth. FIG. 12A shows the bracket 142 touching at one point 142a on the tooth 126; and FIG. 12B shows the bracket 144 touching at the opposite point 144a on the tooth 126.

Thus, different bracket placements are designed with respect to the tooth surface in order to realize different forces, such as torque, angulation and/or translational or rotational movements of the tooth in the desired directions.

Figure 13:
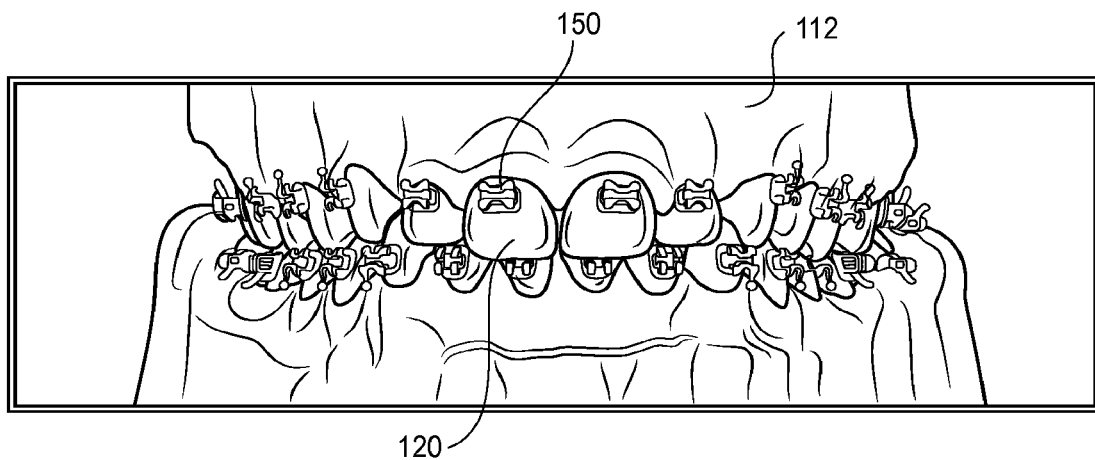
FIG. 13 shows the digital malocclusion model of the patient of FIG. 2 with the brackets placed on the teeth in accordance with the bracket-positions on the teeth in the target positions per FIG. 9.

FIG. 13 shows the digital malocclusion model of the patient of FIG. 2 with the brackets placed 150 on the teeth 120 in accordance with the bracket-positions on the teeth in the target positions per FIG. 9. FIG. 13 shows the target placement of the brackets on the teeth which will be used to design the TAP device in accordance with the disclosed herein.

One skilled in the art would appreciate that the target set-up can be done either automatically or manually by an operator or a combination of the two can be used as well.

TAP Device Design & Manufacturing

Figure 14:
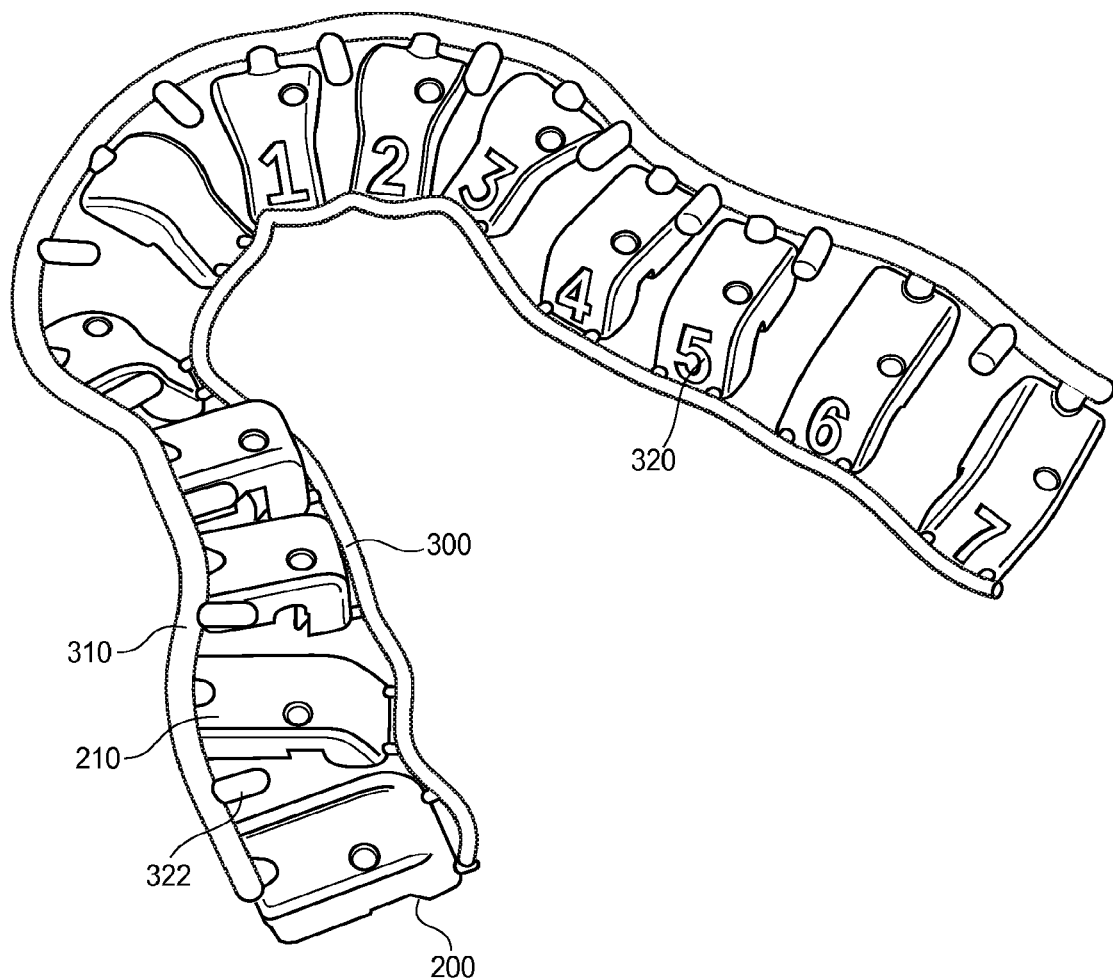
FIG. 14 shows the preferred embodiment of the disclosure, namely the design of the TAP (Tooth Attachment Placement) device created by the system described in FIG. 1 in accordance with the placement of the brackets on the teeth as shown in FIG. 13.

FIG. 14 shows the preferred embodiment of the disclosure, namely the design of the TAP device created by the system described in FIG. 1 in accordance with the placement of the brackets on the teeth as shown in FIG. 13. The TAP device 200 consists of single tooth jigs 210 interconnected through splines 300 and 310. Each jig 210 has a specific tooth number 320 engraved on it indicating the particular tooth associated with the jig. Each jig is designed to hold an attachment or a bracket to be placed on a tooth. Additionally, there are over mold retention pegs 322 attached to the spline 310. Geometry of the TAP device is automatically designed by the system described in FIG. 1, without requiring any manual interaction of an operator. The design is created in the form of a digital STL File for exporting it to an apparatus for manufacturing the TAP device.

The spline is made with unique width in a small shape from rigid material. This design helps in keeping the elements of the TAP device in the desired position. The cross section of the spline can be different for each spline and designed to carry the UV rays as well as provide the snap points to break the sections apart when needed.

The distances between the jigs on the spline can vary depending upon the geometry of the dentition, and for providing enough space to effectively place the jigs, and thereby the brackets or the attachments on the teeth.

The TAP device can be designed to serve the upper jaw and the lower jaw together.

Bracket placement within the TAP device jigs can be made either manually or with a robot.

The TAP device can be designed for a single tooth, multiple teeth or the full arch. The TAP device can be designed in segments as well.

The TAP device can be made locally at an orthodontist's practice or remotely at a manufacturing facility.

The bracket holder in a jig in a TAP device can have two walls, three walls or four walls for properly holding the bracket.

The TAP device is made from a non-flexible, biocompatible material using an additive manufacturing process apparatus such as a 3D printer. Properties of the preferred biocompatible material are listed in Table 1. The preferred material for making the TAP device is in the liquid form; however, materials in the powder form or any other form suitable for 3D printing apparatus can also be used.

TABLE 1

| Property | ASTM | Metric | | Imperial | |
|---|---|---|---|---|---|
| Tensile Strength | D-638-03 | MPa | 50-65 | psi | 7,250-9,450 |
| Modulus of Elasticity | D-638-04 | MPa | 2,000-3,000 | psi | 290,000-435,000 |
| Elongation at Break | D-638-05 | % | 10-25 | % | 10-25 |
| Flexural Strength | D-790-03 | MPa | 75-110 | psi | 11,000-16,000 |
| Flexural Modulus | D-790-04 | MPa | 2,200-3,200 | psi | 320,000-465,000 |
| Izod Notched | D-256-06 | J/m | 20-30 | ft lb/in | 0.375-0.562 |

TABLE 1-continued

| Property | ASTM | Metric | | Imperial | |
|---|---|---|---|---|---|
| Impact HDT at 0.45 MPa | D-648-06 | ° C. | 45-50 | ° F. | 113-122 |
| Water Absorption 24 Hr | D570-98 | % | 1.1-1.5 | % | 1.1-1.5 |

The TAP device is preferably made from clear/transparent or translucent material. The splines are made in the form of tubes. Such a design enables the spline to carry ultra-violate light or rays for curing the bracket pads attached to the teeth surfaces; thereby enabling firm attachments of the brackets to the teeth once the brackets are placed on the teeth using the TAP device.

There are marks placed on the splines so that the splines can be broken at those points in order to remove the jigs or the holders once the brackets are bonded to the teeth.

The TAP device described above can be used for attaching other types of attachments, such as aligner attachments, to the teeth as well.

The TAP devices are packaged in ultra-violet resistance boxes for storage and shipping purposes.

There are many advantages of the TAP device over the conventional similar devices. The TAP device is created in labial and lingual versions. It provides better fit compared to the conventional deep-drawn Indirect Bonding (IDB) Trays. Bonding of all brackets can be achieved in one step. If needed, the TAP device can be cut into segments for certain malocclusions. Re-bonding of a single tooth can be achieved by using only one cut-out jig. TAP device can be designed to include jigs for later bonding of teeth that cannot be bonded initially (because the tooth is not erupted, or requires rotation, etc.). The cost of producing a customized TAP device is low compared to commercially available TDB Trays.

In summary, as disclosed before, (a) the single tooth jigs of a TAP device are connected through splines or other elements of different configuration(s); (b) the TAP device design is stored in a digital file, preferably in the STL format, or in any other suitable format including STEP or VDA; (c) the TAP device is created from a non-flexible biocompatible material, or from semi flexible or flexible material, or from a hybrid combination of flexible and non-flexible materials; and (d) the TAP device is produced by a generative manufacturing apparatus, such as a 3D printer in accordance with the digital file of the TAP device design.

FIGS. 15-19 show various applications of the TAP device as described below.

Figure 15:
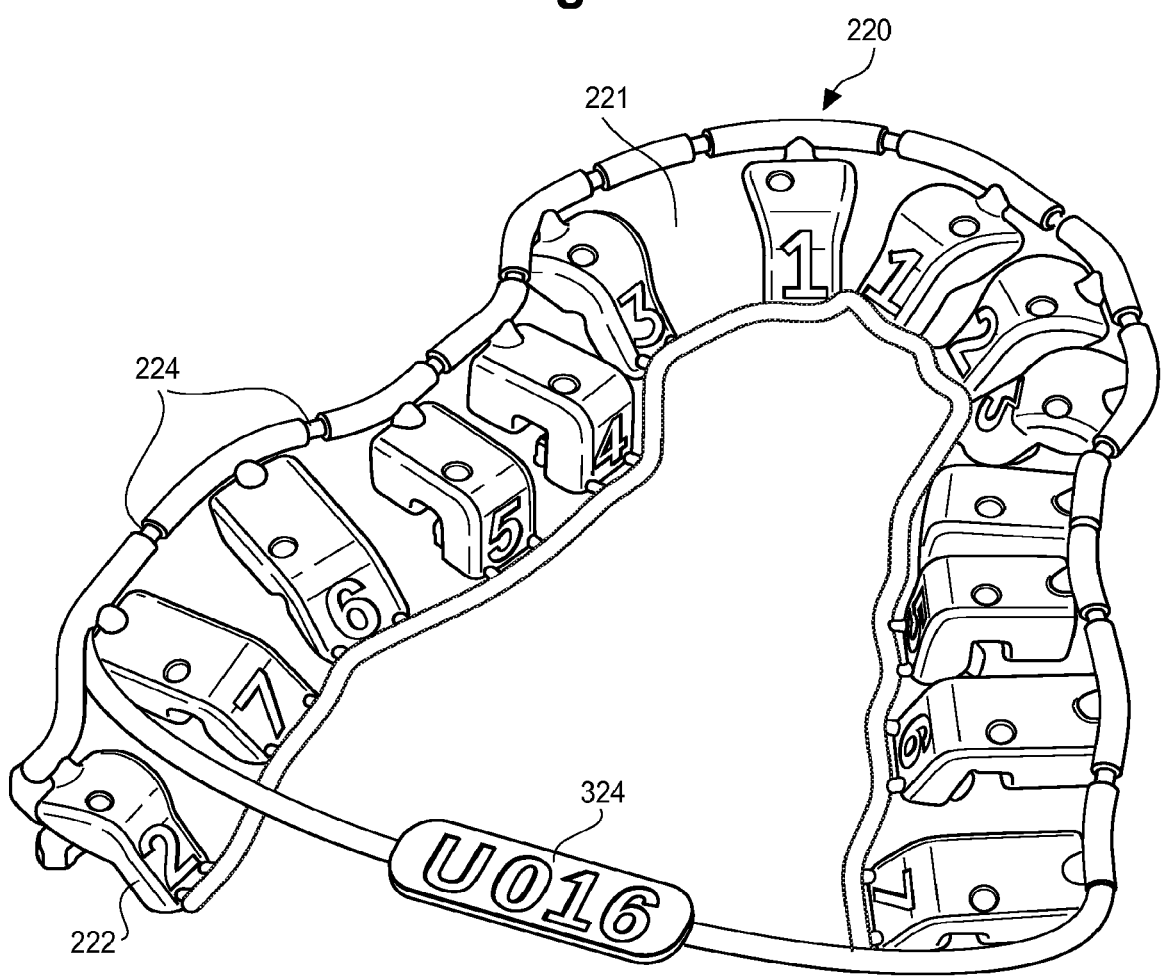
FIGS. 15-19 show various applications of the TAP device as described below.

FIG. 15 shows a lingual TAP device 220. Jig at the location 221 is skipped in this case since the corresponding tooth is in position so that the jig cannot be used along with the other jigs. So, an additional jig 222 is added for a later use. The figure shows the patient identifier link 324. The patient identifier link 324 as well as the additional jig 222 can be detached from the TAP device before bonding the brackets on the teeth using the TAP device. Every jig can be broken apart at points 224 on the splines after bonding. The jig 222 can be used at a later appropriate time for bonding a bracket on the particular tooth at the position 221 that was initially skipped.

The calculation of how much occlusal surface to cover on each tooth is a critical parameter. In crowded cases it is tricky to create enough space between the jigs to allow for the bends in the splines. The TAP device design disclosed herein, which aims at effectively creating a TAP device with spaces in between is indeed unique. The jigs are attached by one or more splines of various potential shape. Varying the width trades flexibility (thinner jigs) of the TAP device against stability (wider jigs). Stability can be offset by bonding multiple teeth at once or by going to a single jig with full occlusal coverage in situations where the tooth is hard to get to at the same time as bonding the adjacent teeth. Having the space will also reduce the printing cost which is calculated by material needed.

Figure 16:
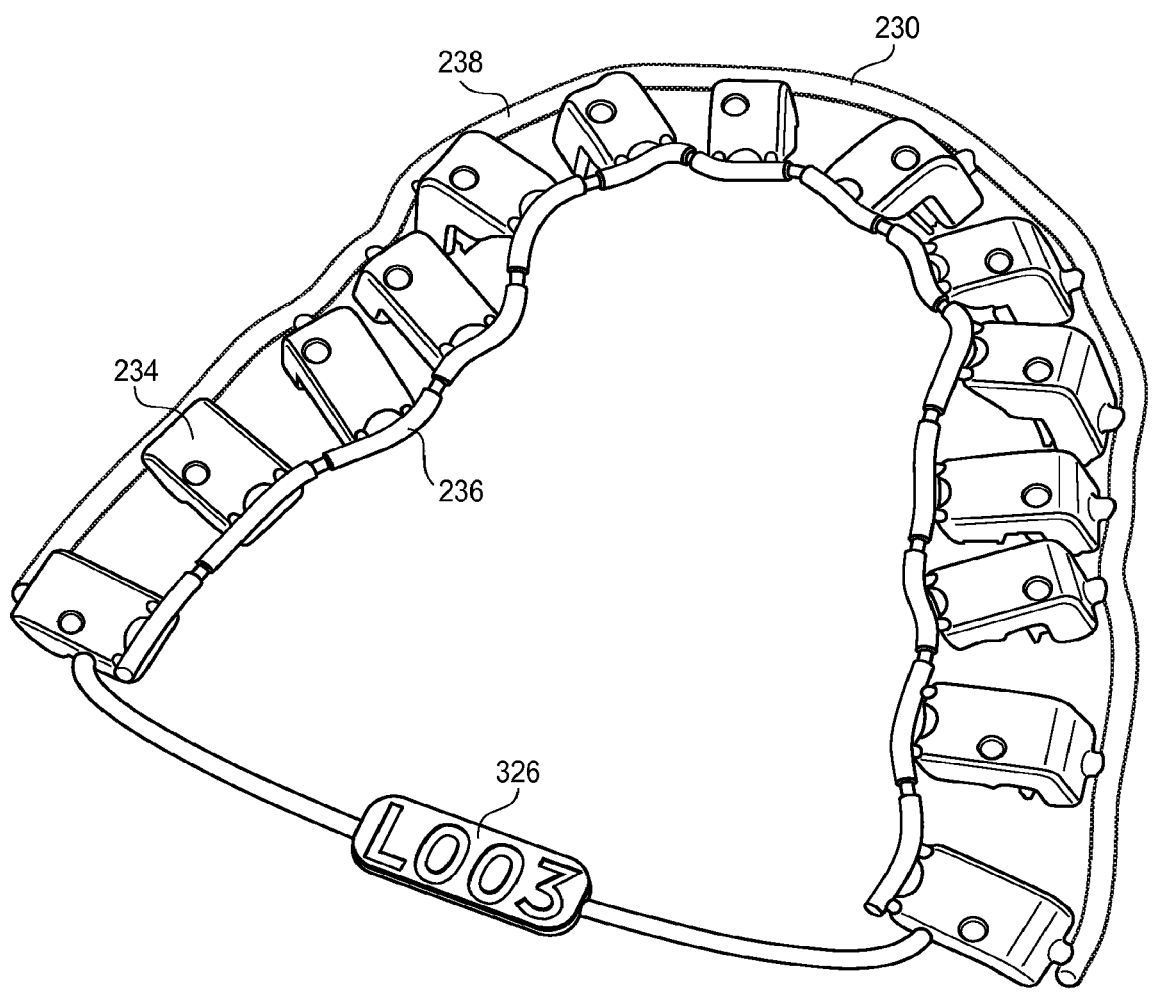

FIG. 16 shows a labial TAP device 230 for a lower jaw, including jigs 234, splines 236 and 238 and patient identifier 326.

Figure 17:
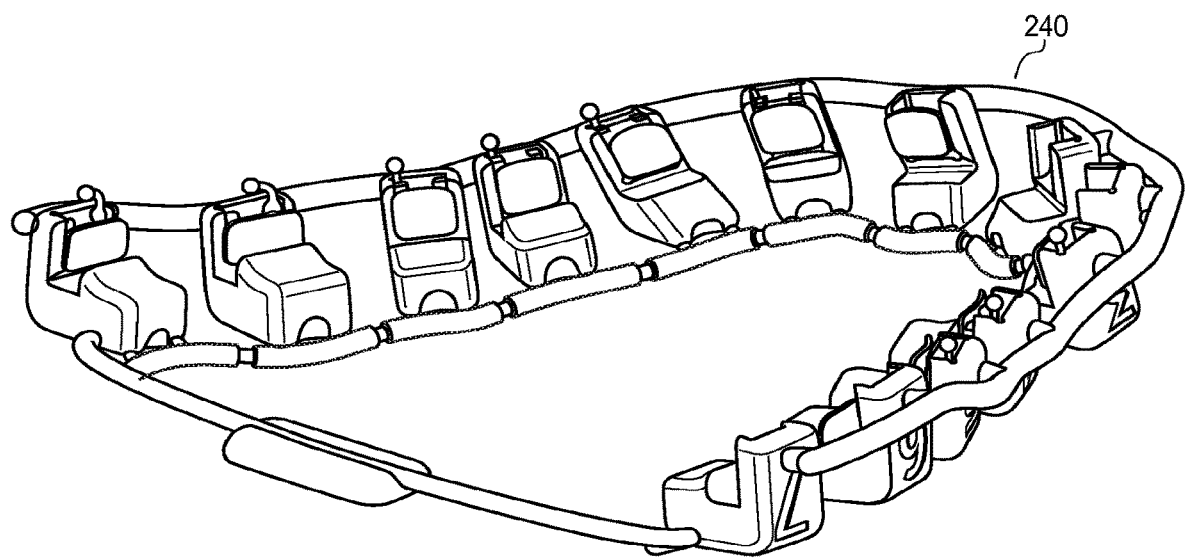

Similarly, FIG. 17 shows a labial TAP device 240 for an upper jaw.

Figure 18:
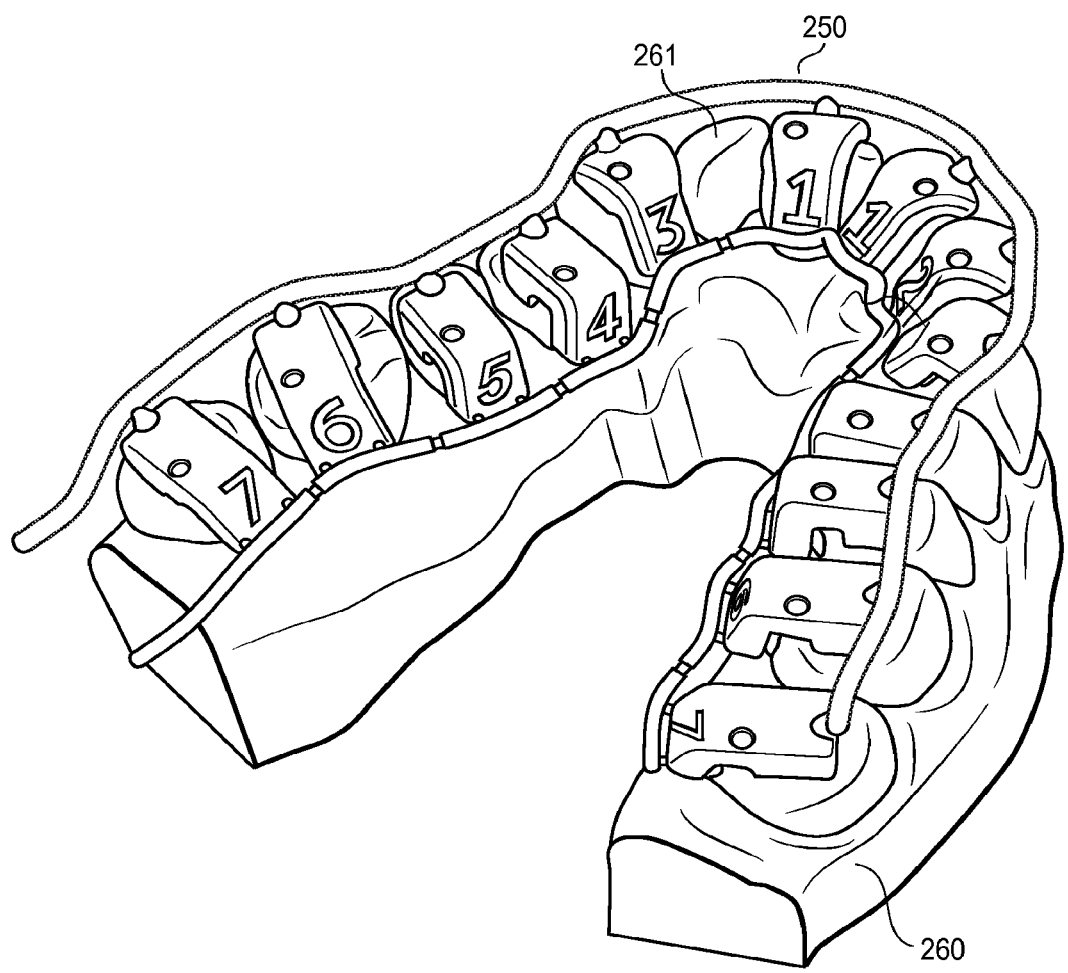

FIG. 18 shows a lingual TAP device 250 placed on the physical model 260 of a jaw. Jig for tooth 261 is skipped in this case since the tooth is in a rotated position so that the jig cannot be used in this state.

Figure 19:
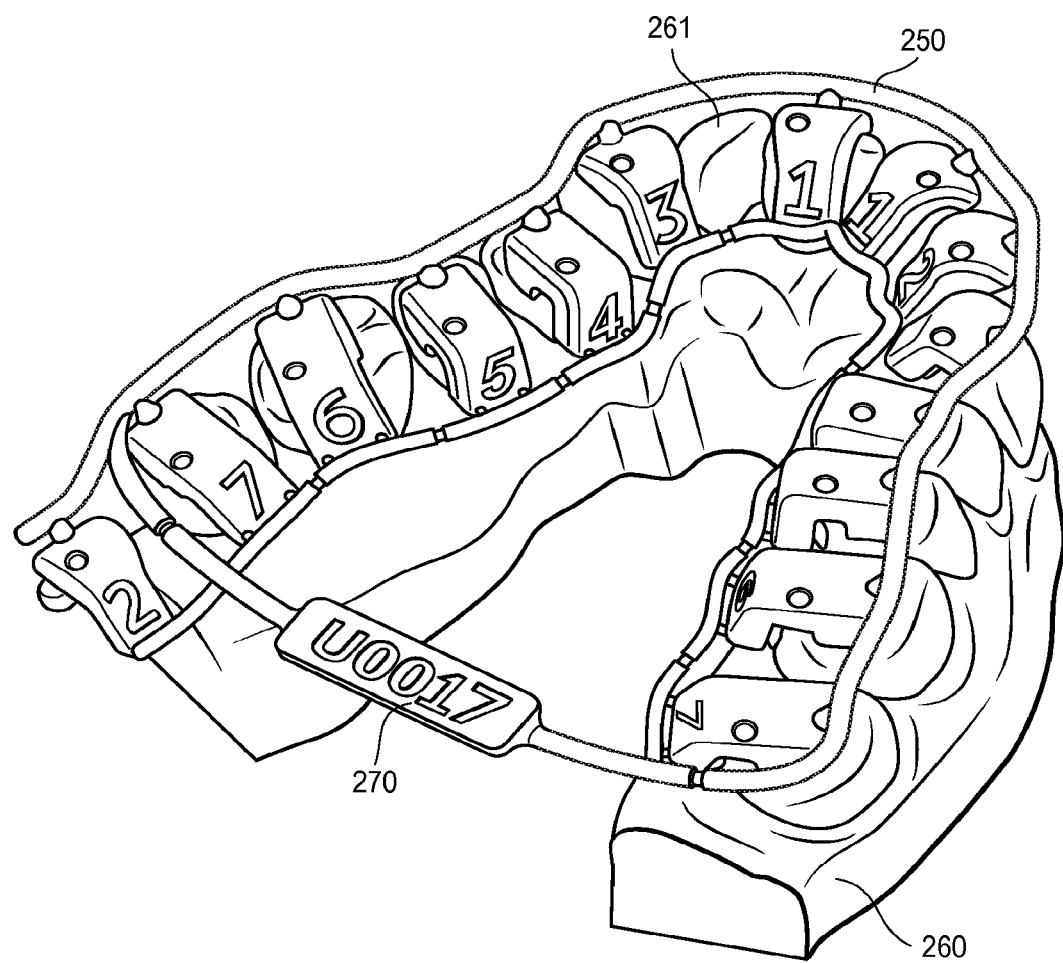

FIG. 19 shows a lingual TAP device 250 placed on the physical model 260 of the jaw as shown in FIG. 18, and additionally with a patient identification link 270. In this view also the jig for tooth 261 is skipped in this case since the tooth is in a rotated position so that the jig cannot be used in this state.

FIGS. 20-32 show various details of the TAP device design as described below.

Figure 20:
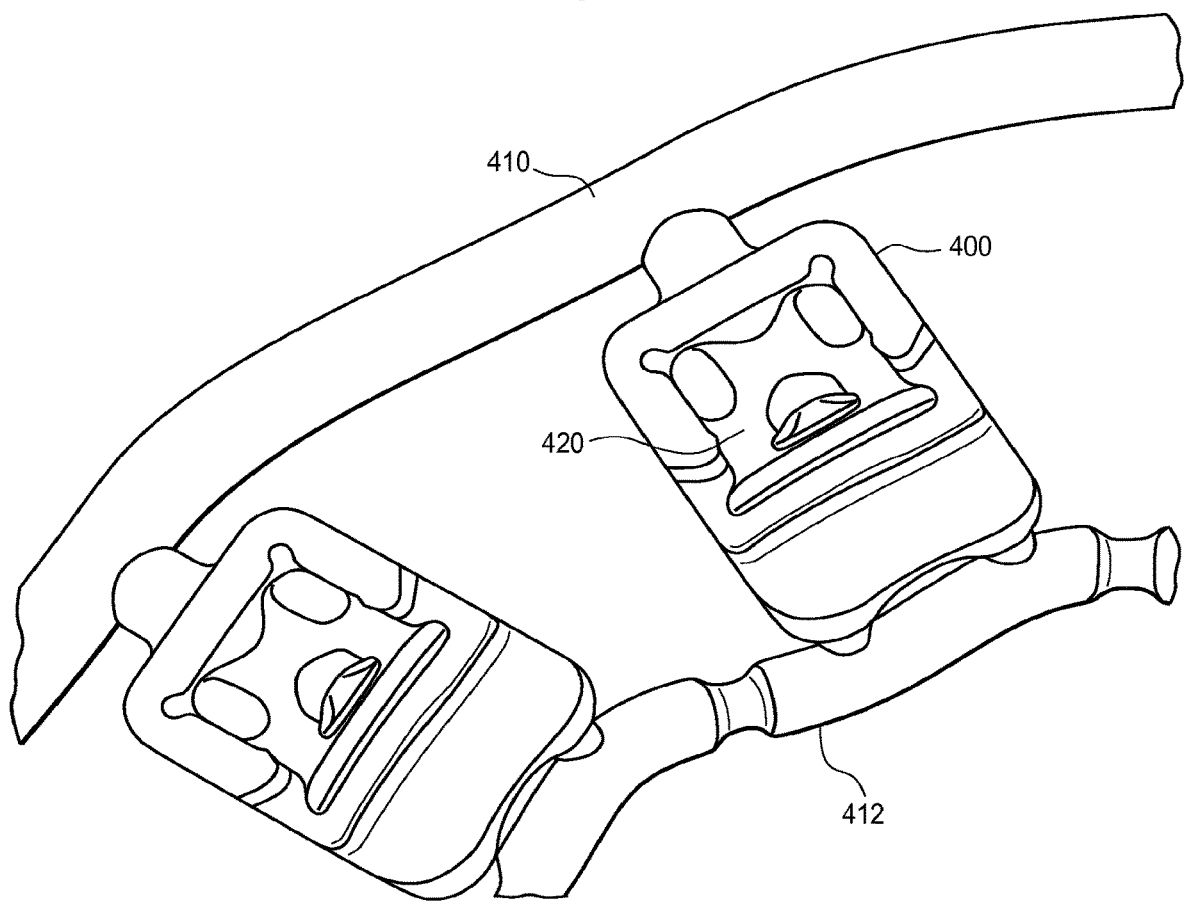
FIGS. 20-32 show various details of the TAP device design as described below.

FIG. 20 shows the bracket holding geometry of the TAP device including the jig or the holder 400, the splines 410 and 412, and the bracket 420.

Figure 21:
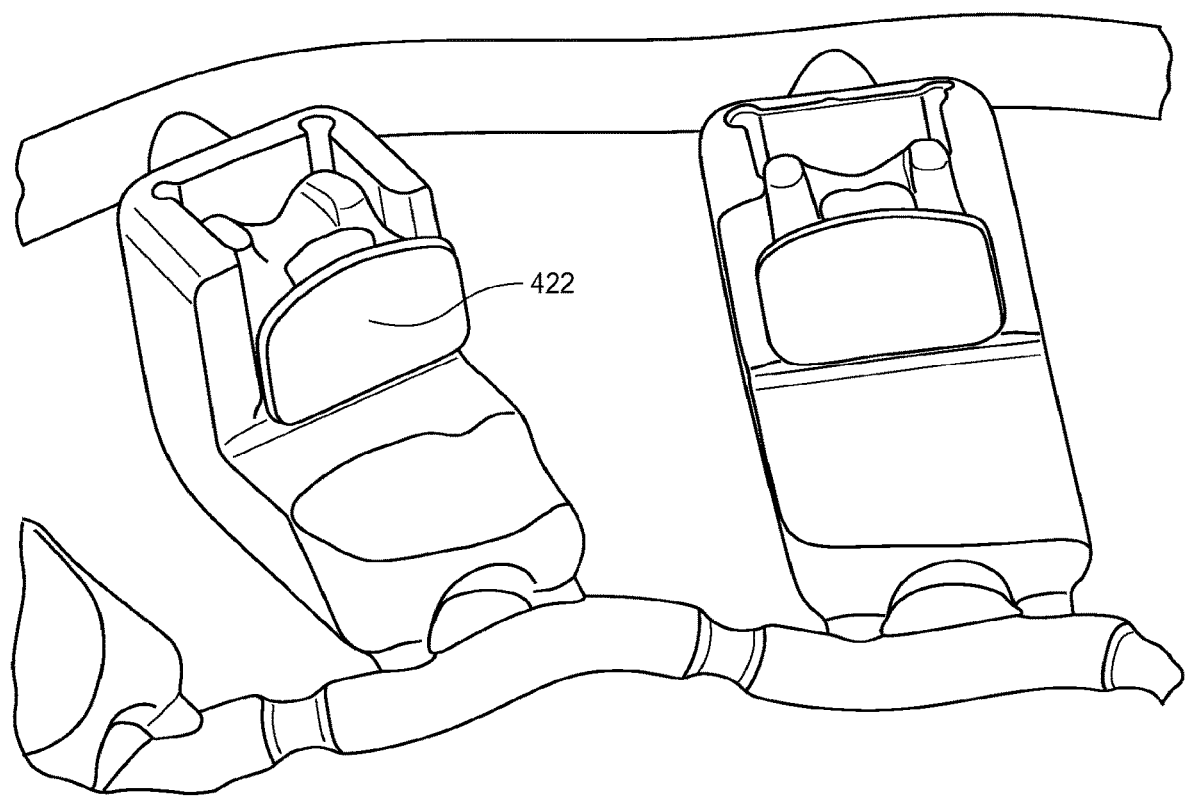

FIG. 21 shows another view of the bracket holding geometry of the TAP device shown in FIG. 20 including the bracket base 422.

Figure 22:
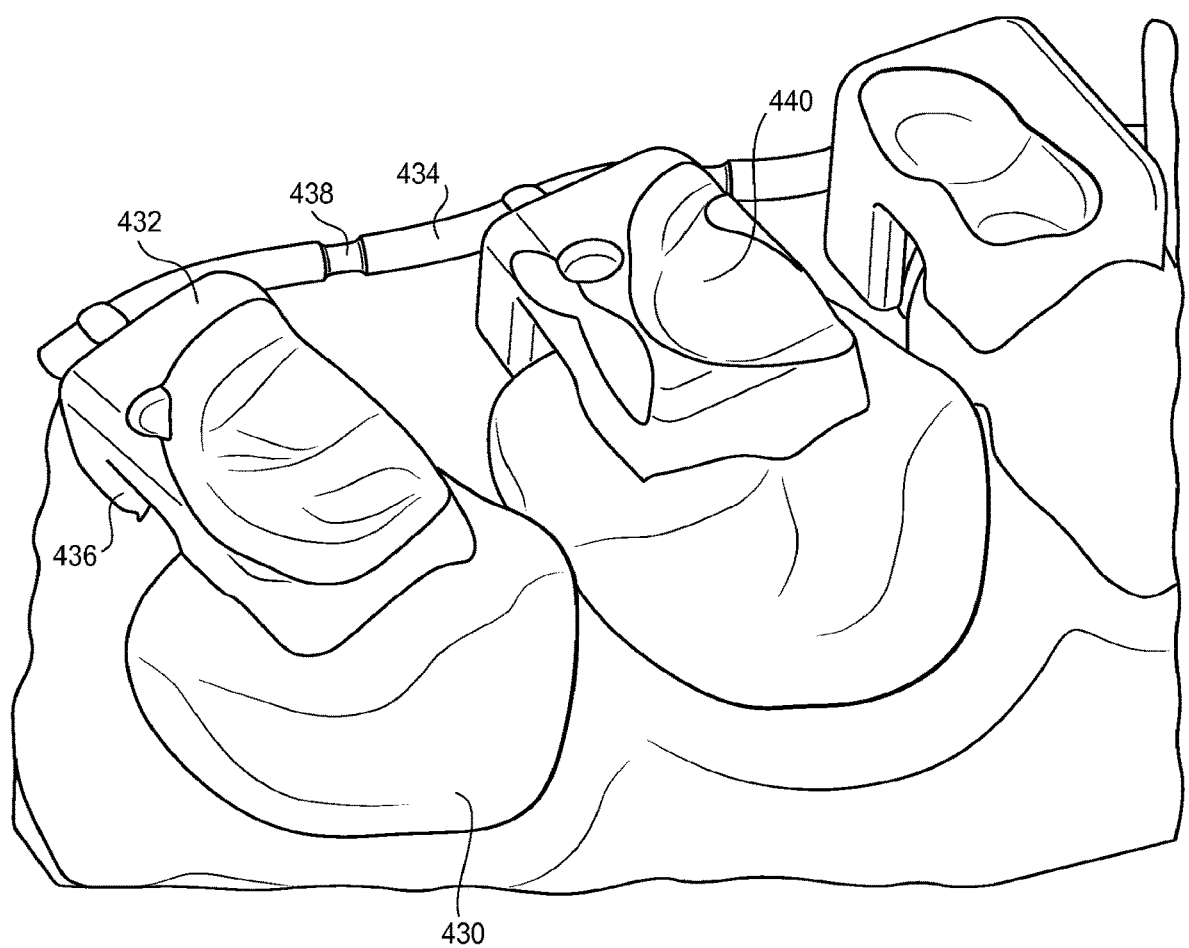

FIG. 22 shows stabilizing the TAP device by closing the teeth. This figure shows the lower teeth 430, the jig or the holder 432, the spline 434, the bracket 436, the spline breaking point 438 and bite 440.

Figure 23:
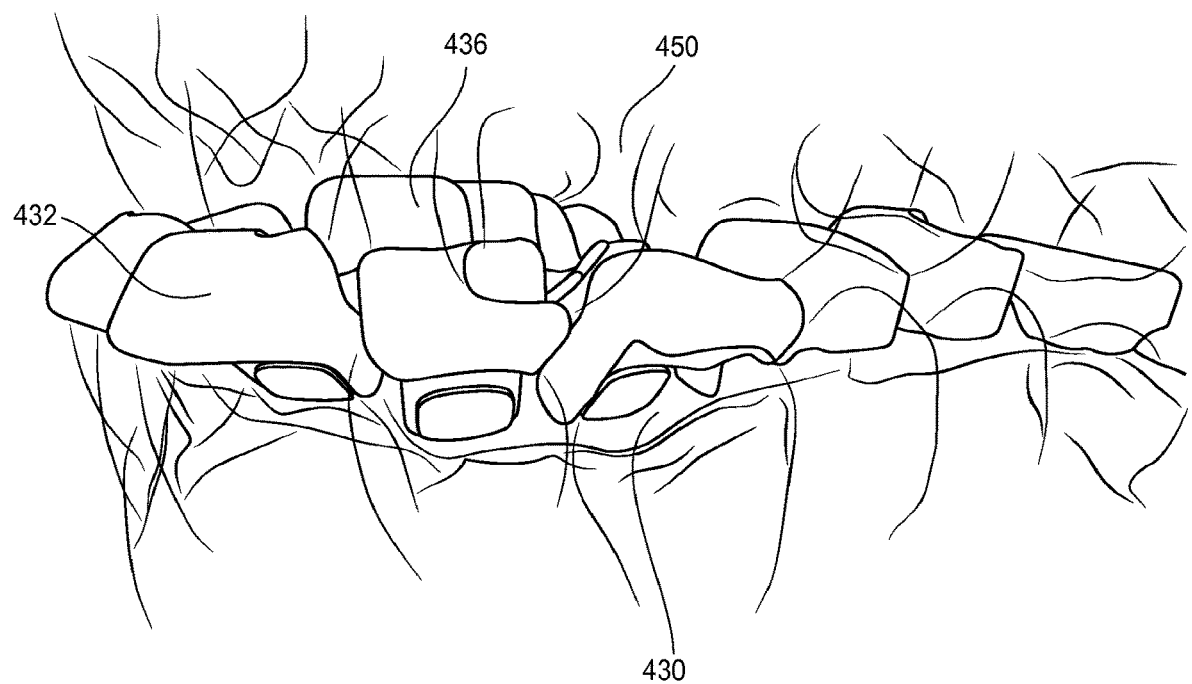

FIG. 23 shows another example of stabilizing the TAP device by closing the teeth. The lingual view is shown. This figure shows the lower teeth 430, the jig or the holder 432, the bracket 436 and the upper teeth 450.

Figure 24:
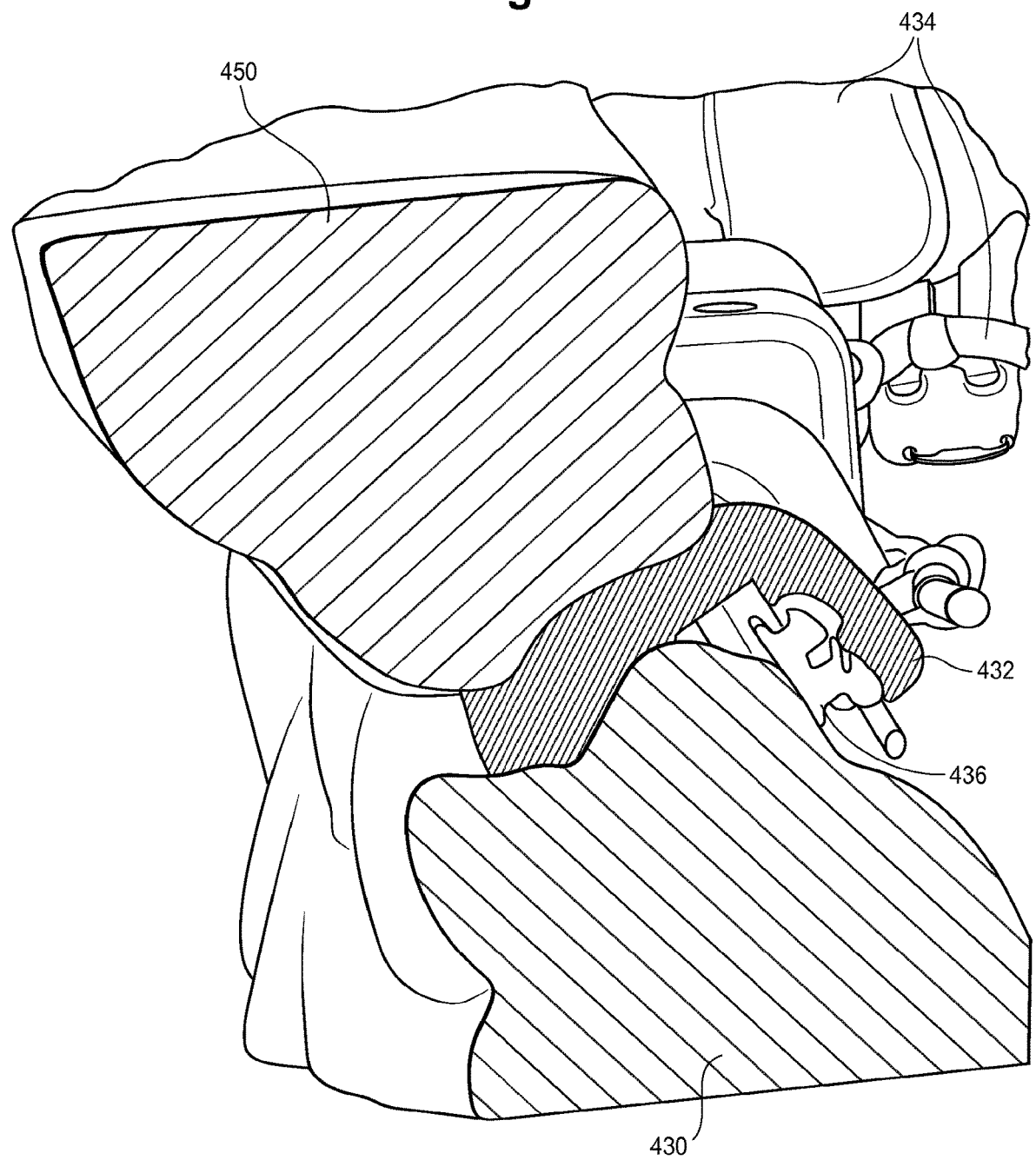

FIG. 24 shows another example of stabilizing the TAP device by closing the teeth. The labial view is shown. This figure shows the lower teeth 430, the jig or the holder 432, the spline 434, the bracket 436 and the upper teeth 450.

Figure 25:
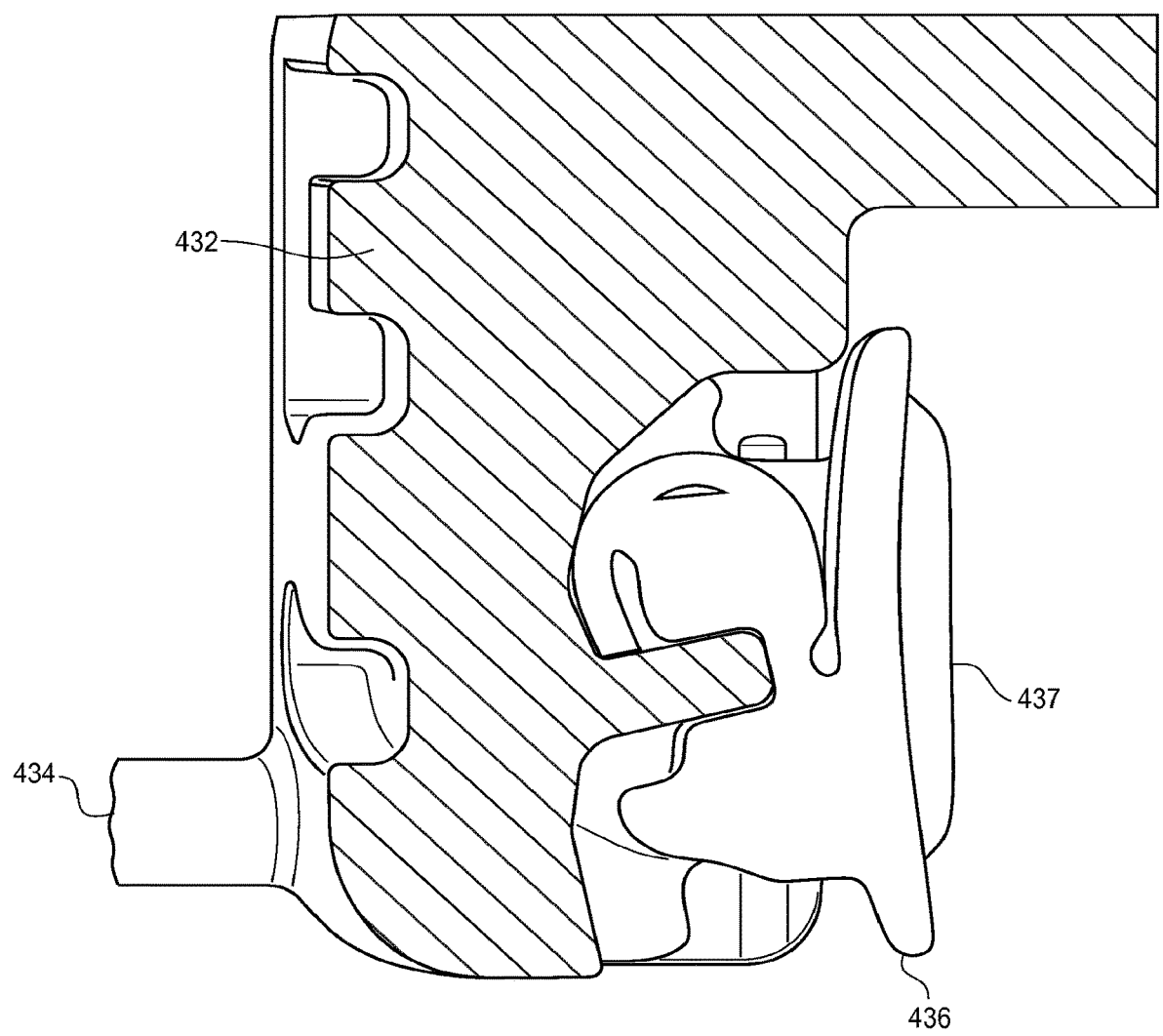

FIG. 25 shows a section of the TAP device showing side view of a counter shaped slot. This figure shows the jig or the holder 432, the spline 434, the bracket 436 and the pad 437.

Figure 26:
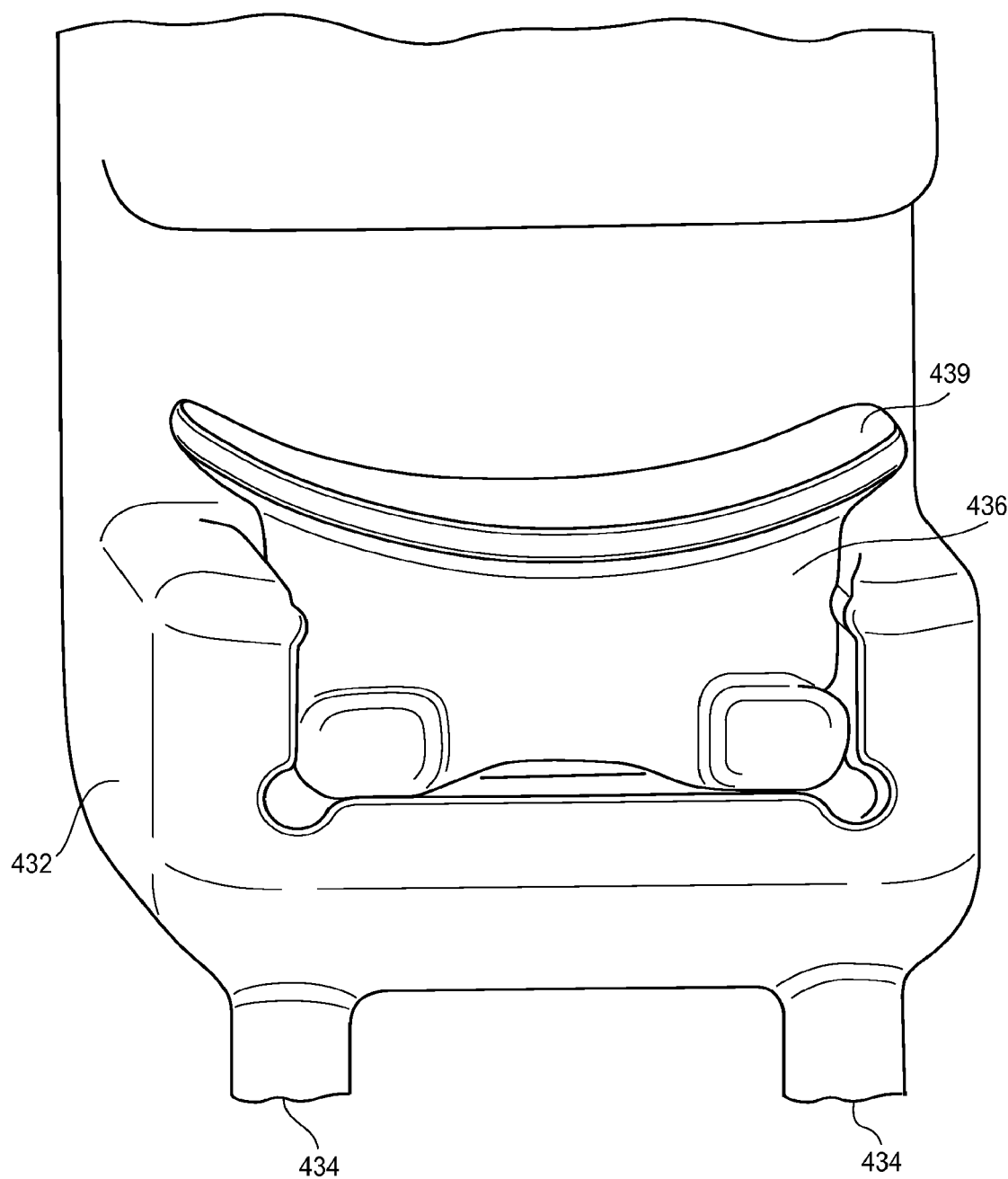

FIG. 26 shows the sane section of the TAP device of FIG. 25, showing front view of the counter shaped slot. This figure shows the jig or the holder 432, the spline 434, the bracket 436 with the base 439.

Figure 27:
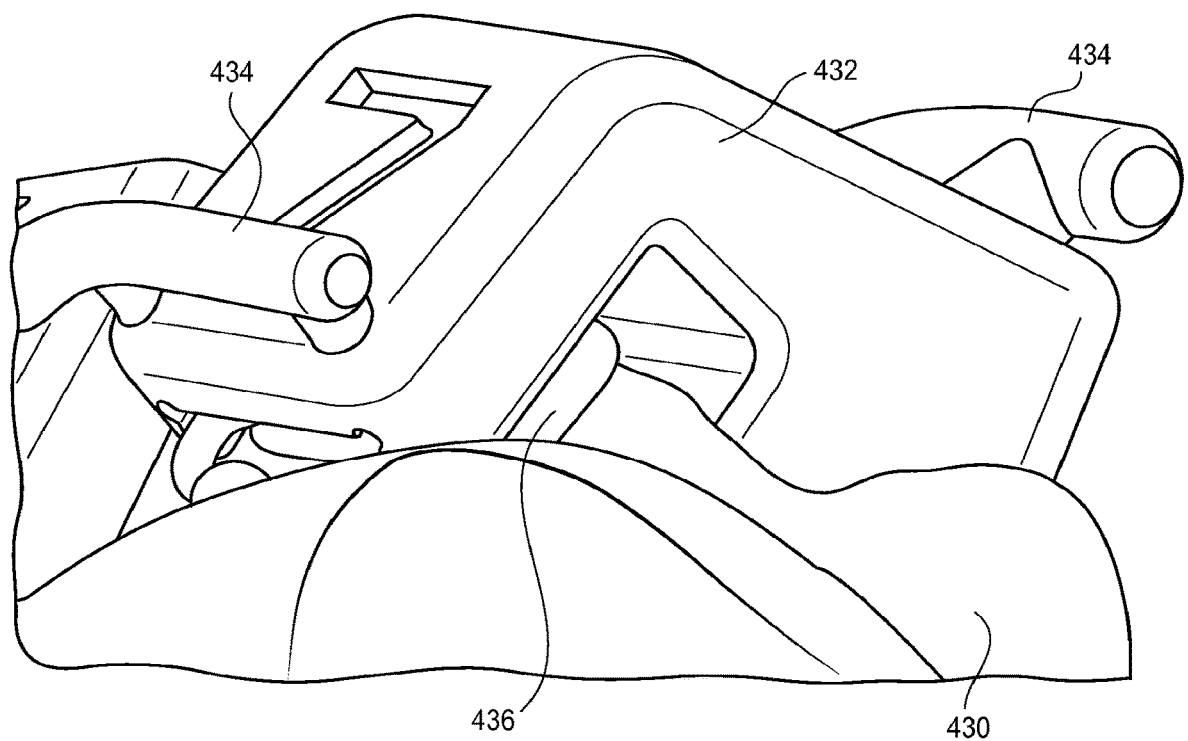

FIG. 27 shows a section of the TAP device showing hollow tubes. This figure shows the tooth 430, the jig or the holder 432, the spline 434 and the bracket 436. It should be noted that the splines are made of hollow tubes. They are translucent and designed to carry light to cure the bracket pads for attaching the brackets to the teeth.

Figure 28:
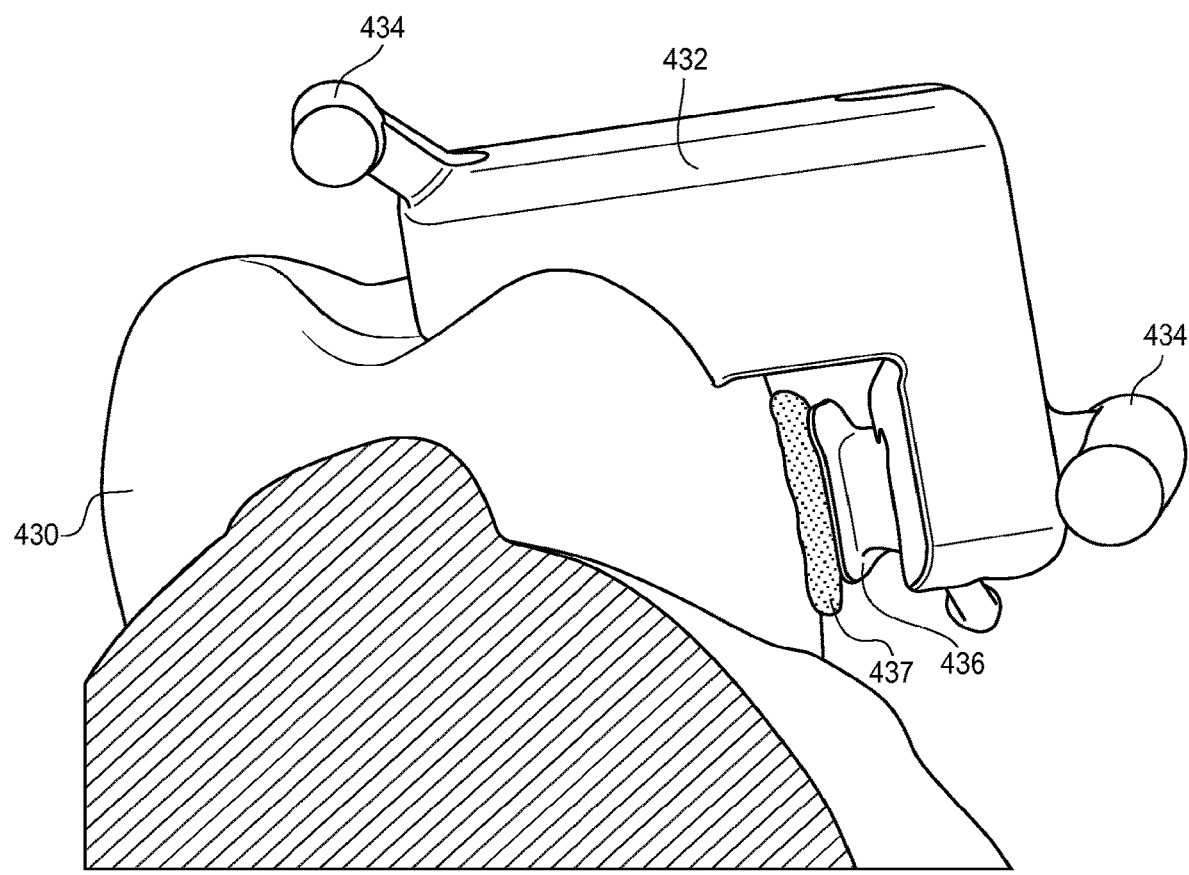

FIG. 28 shows a section of the TAP device showing an example of the distance between the bracket surface and the tooth surface. This figure shows the tooth 430, the jig or the holder 432, the spline 434, the bracket 436 and the pad 437 filling the distance between the surface of the tooth 430 and the base of the bracket 436.

Figure 29:
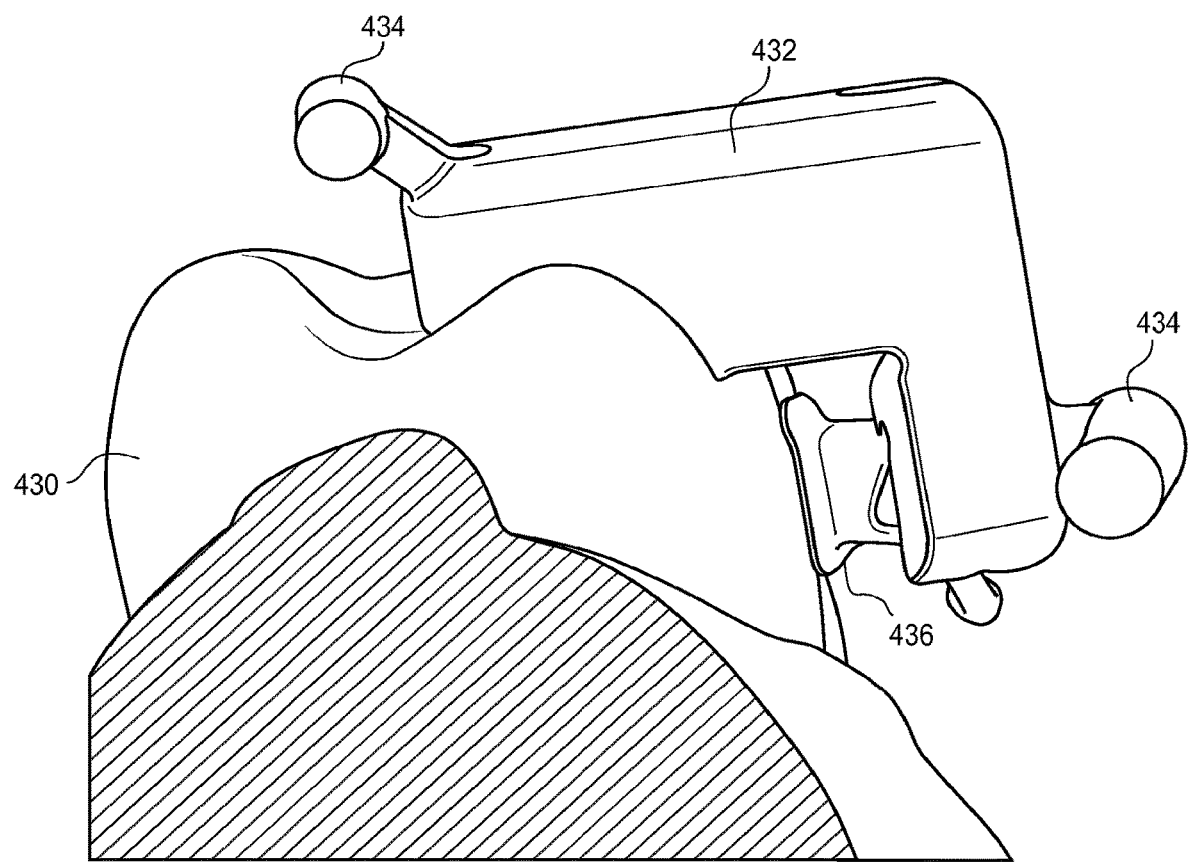

FIG. 29 shows a section of the TAP device showing another example that there is no distance between the bracket surface and the tooth surface. This figure shows the tooth 430, the jig or the holder 432, the spline 434 and the bracket 436. There is no distance between the surface of the tooth 430 and the base of the bracket 436. So, the bracket base has a thin layer of glue or adhesive, not shown in the figure, for attaching the bracket to the tooth.

Figure 30:
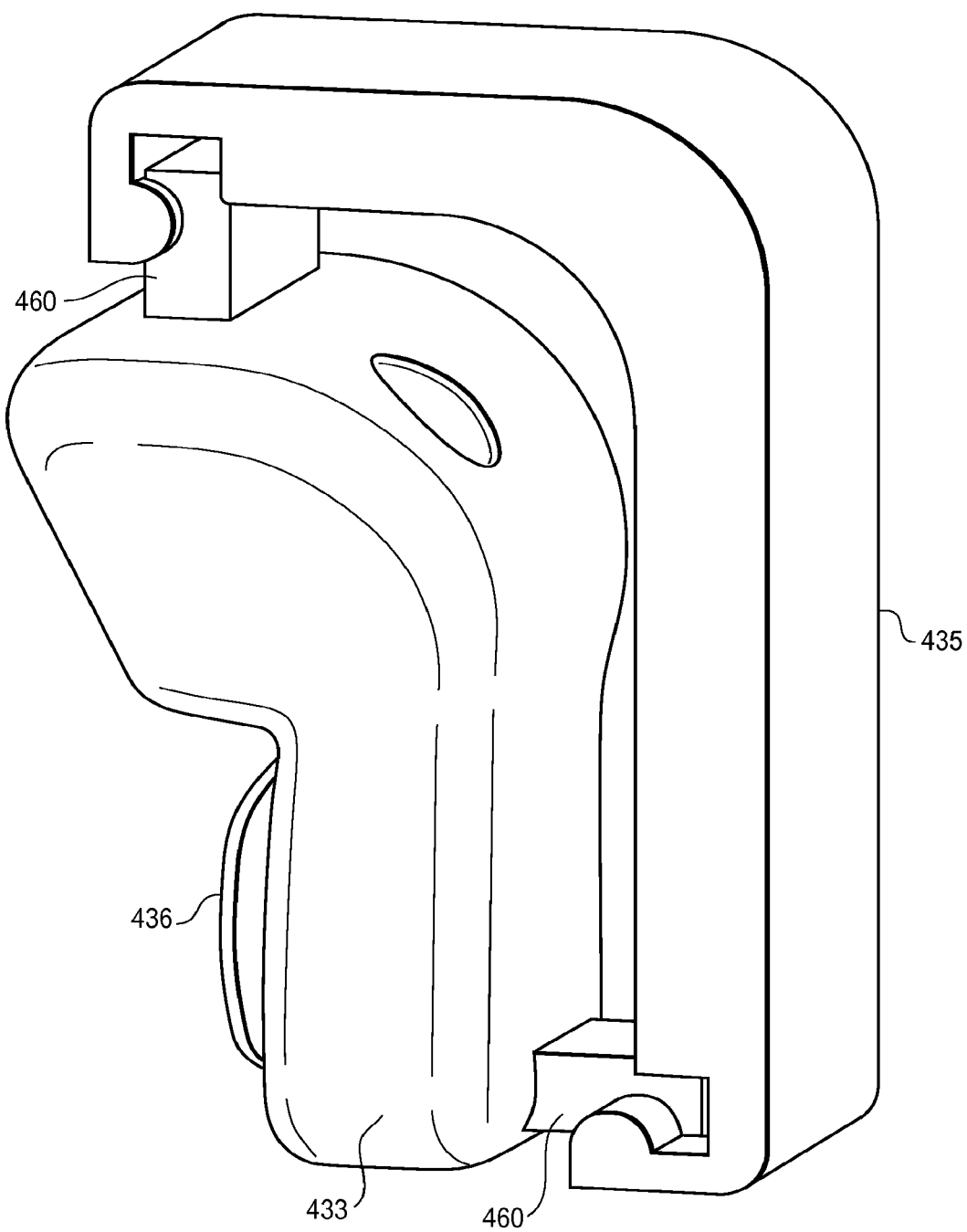

FIG. 30 shows a section of the TAP device showing a snap fit. The figure shows the jig or the holder 433, the spline or the frame of the TAP device 435 and the bracket 436. The frame of the TAP device 435 holds the jig 433 with the snap 460. Alternately, this holding arrangement can be in the form of a ball and socket.

Figure 31:
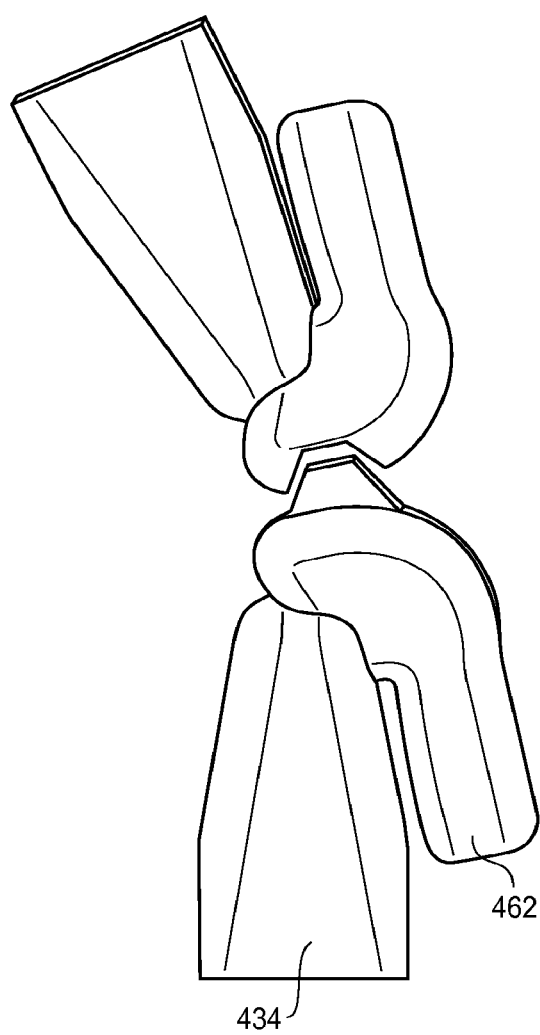

FIG. 31 shows a section of the TAP device showing an example of the form-fitting elements. The figure shows a portion of the spline or frame 434 and an over mold 462 performing the form fitting in to the frame 434.

One skilled in the art would appreciate that other designs of the TAP device are possible.

Figure 32:
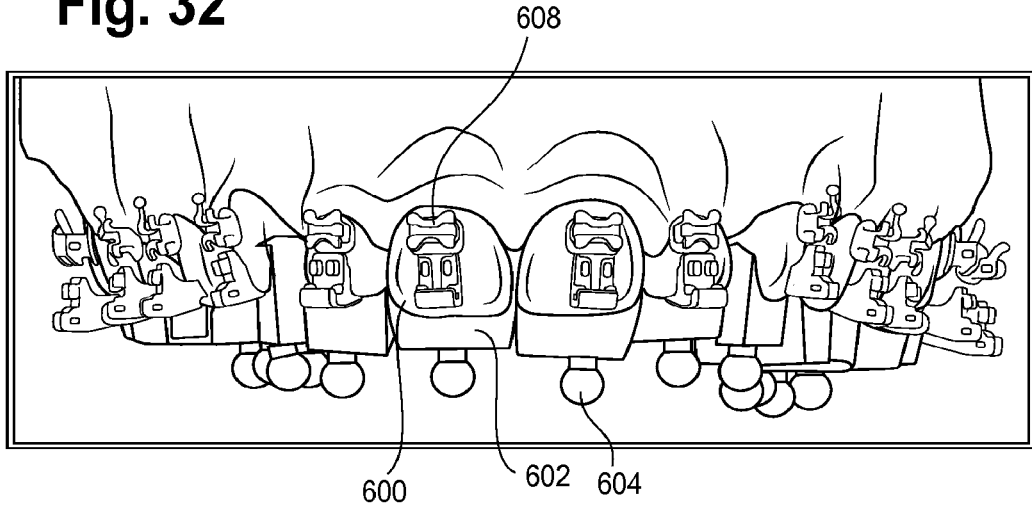

FIG. 32 shows another embodiment of the disclosure showing a design of another type of TAP device based upon the brackets placed on the patient's malocclusion. The figure shows teeth 600, clip holder 602, retention peg 604 and bracket 608.

Figure 33:
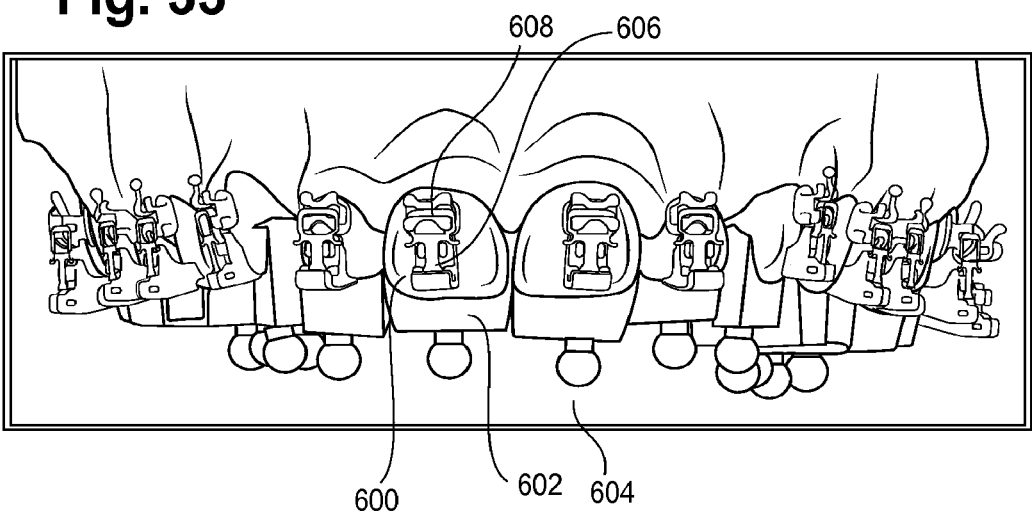
FIG. 33 shows design of another type of TAP device shown in FIG. 33 with clips inserted in the clip holder.

FIG. 33 shows design of another type of TAP device shown in FIG. 32 with clips 606 inserted in the clip holder 602. The figure also shows teeth 600, retention peg 604 and bracket 608.

Figure 34:
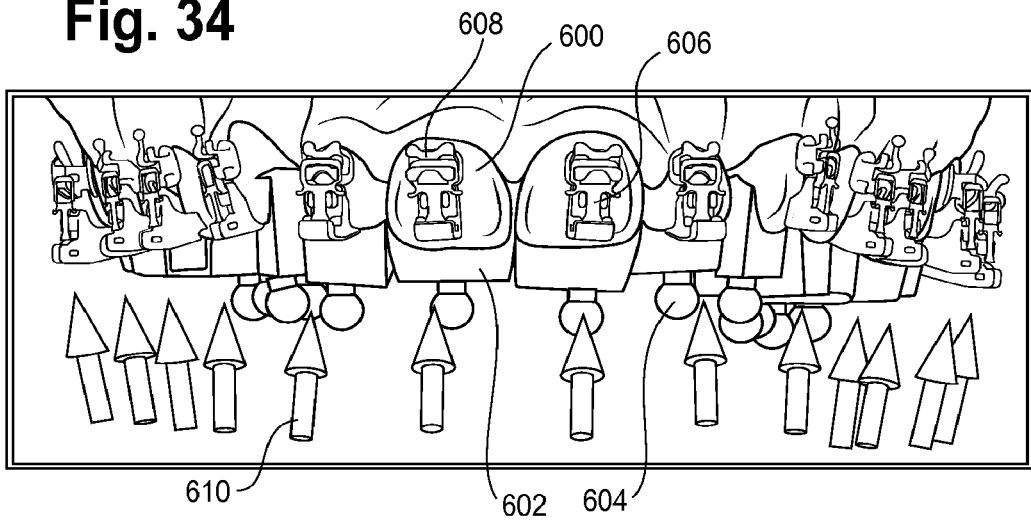
FIG. 34 shows the design of the TAP device shown in FIG. 33 with orientation plane of each bracket.

FIG. 34 shows the design of the TAP device shown in FIG. 33 with orientation plane 610 of each bracket. The figure also shows teeth 600, clip holder 602, retention peg 604, the clip 606 and bracket 608.

Figure 35:
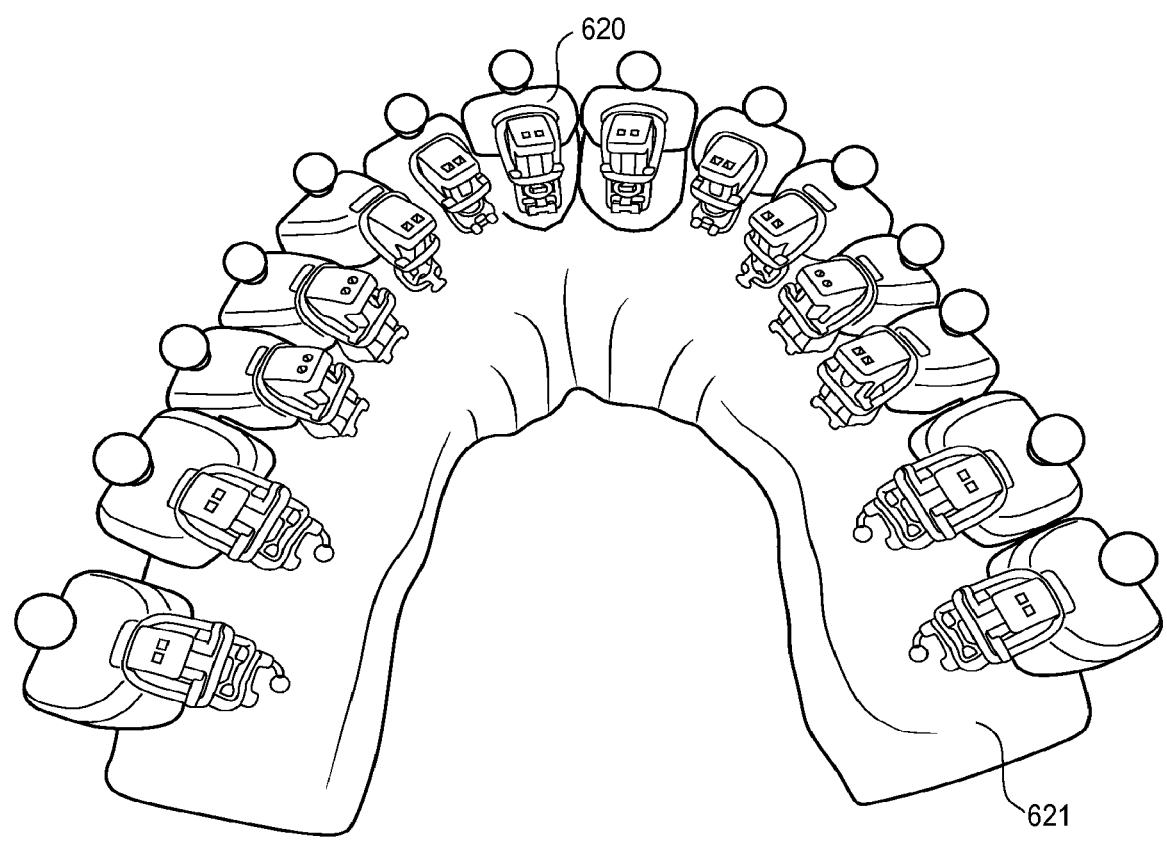
FIG. 35 shows a variation of the TAP device previously shown in FIG. 32 placed on the teeth.

FIG. 35 shows a variation of the TAP device 620 previously shown in FIG. 32 placed on the teeth 621. The TAP device 620 comprises single jigs to bond brackets indirectly to the lingual surface of the teeth. There are several advantages of this TAP device: (a) precise and fast bonding of the brackets on the teeth, (b) single Jig positioning, (c) no deforming of the plastic cap and (d) easy and precise re-bonding of the brackets is possible. The TAP device 620 is manufactured using 3D printing apparatus. Further details regarding the components of this TAP device are explained in FIGS. 36A and 36B.

Figure 36A:
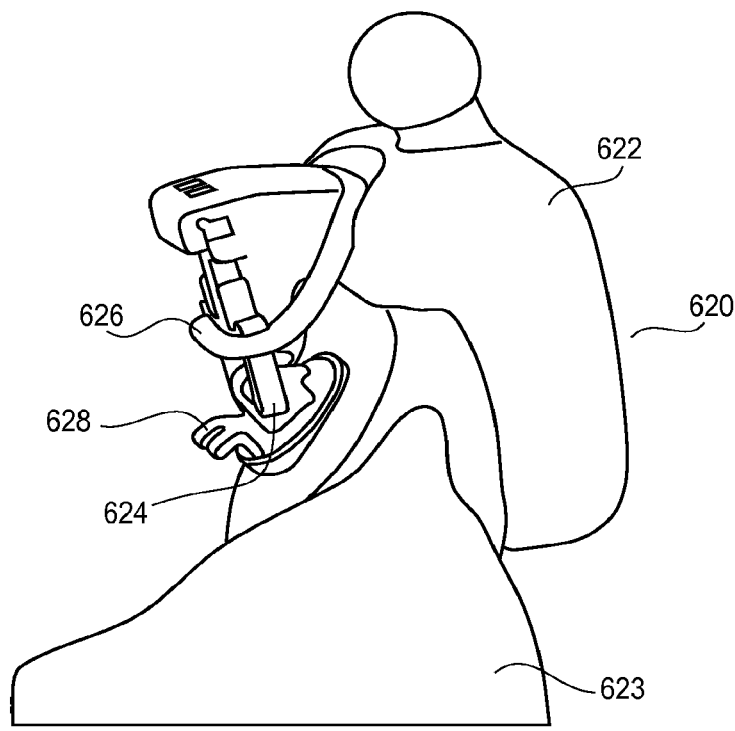
FIG. 36A shows the components of the TAP device for a single tooth, namely cap, metal bracket holder, O-ring and bracket.

FIG. 36A shows the components of the TAP device 620 for a single tooth, namely cap 622, metal bracket holder 624, O-ring 626 and bracket 628. The TAP device is mounted on the tooth 623. The cap fits to the individual tooth and holds the assembly in place. The metal bracket holder is assembled into the cap and holds the bracket in place. The O-ring fixes the metal bracket holder to the cap.

Figure 36B:
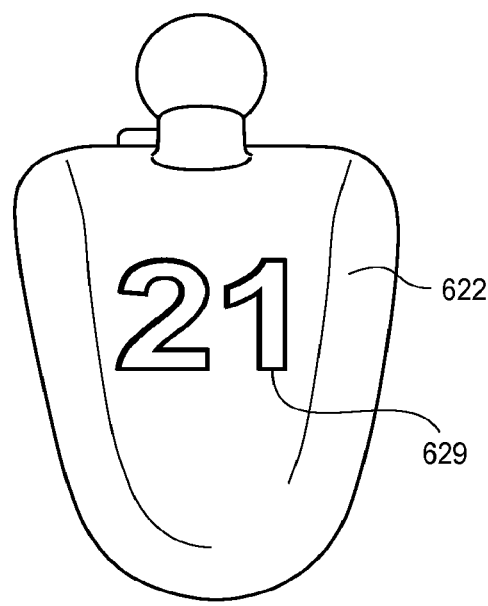
FIG. 36B shows the tooth number, for which the particular jig is designed, placed on the front of the cap.

FIG. 36B shows the tooth number, for which the particular jig is designed, 629 placed on the front of the cap 622.

In case of heavy crowding it is sometime needed to bond brackets later in the treatment. Crowding, especially in the lower jaw, makes it sometimes necessary to bond first alternating bracket. In order to realize such a configuration of the TAP device, the O-Ring, cap and metal bracket holder are removed for selected teeth from the TAP device and bonded after the rest of the brackets are bonded to the teeth. The reason for taking this approach is that the caps sometimes do not fit side by side in case of crowding.

Figure 37:
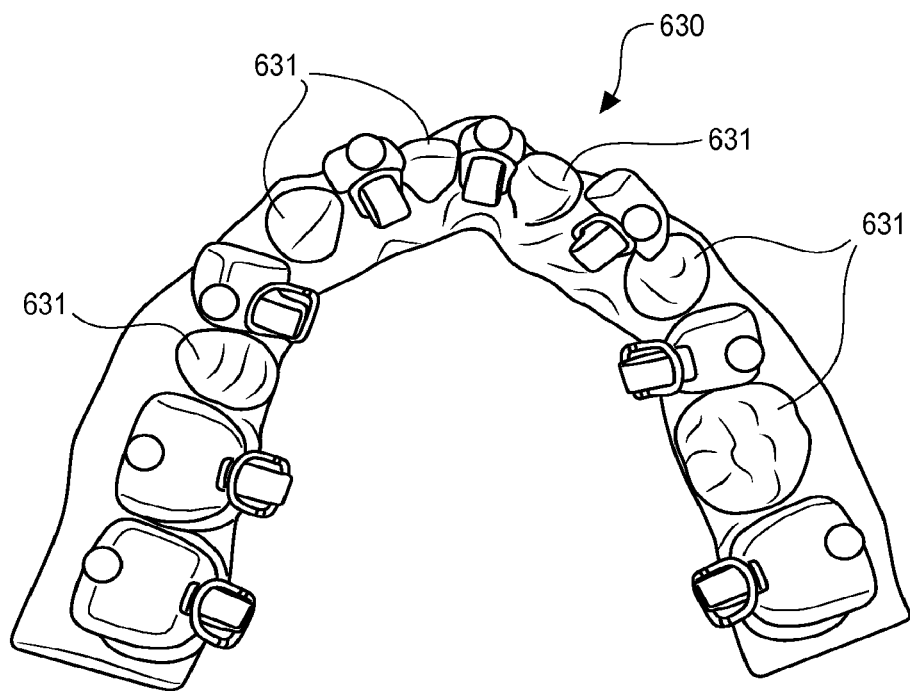
FIG. 37 shows configuration of the TAP device where the jigs are removed for the teeth.

FIG. 37 shows configuration of the TAP device 630 where the jigs are removed for the teeth 631.

The process of preparing a jig, bonding a bracket to a tooth, and subsequently removing the cap and the bracket holder using the TAP device is as follows:

Step 1. Prepare Jigs
 a. Carefully remove the Jig from the printed model.

b. Clean the bonding surface of the bracket. Make sure that no cleaning fluid like acetone or others come in contact with the cap or O-Ring.

c. Add glue to the bonding surface of the bracket and make sure that the applied amount of glue is in the right amount depending upon the type of the glue and the size of the bracket base. Excessive amount of glue may also bond the cap to the tooth, making removal of the cap difficult later on.

d. Prepare tooth surface.

Note: Light bond glue (light polymerization) is preferred to make sure that there is enough time for a precise positioning of the jig.

Figure 38A:
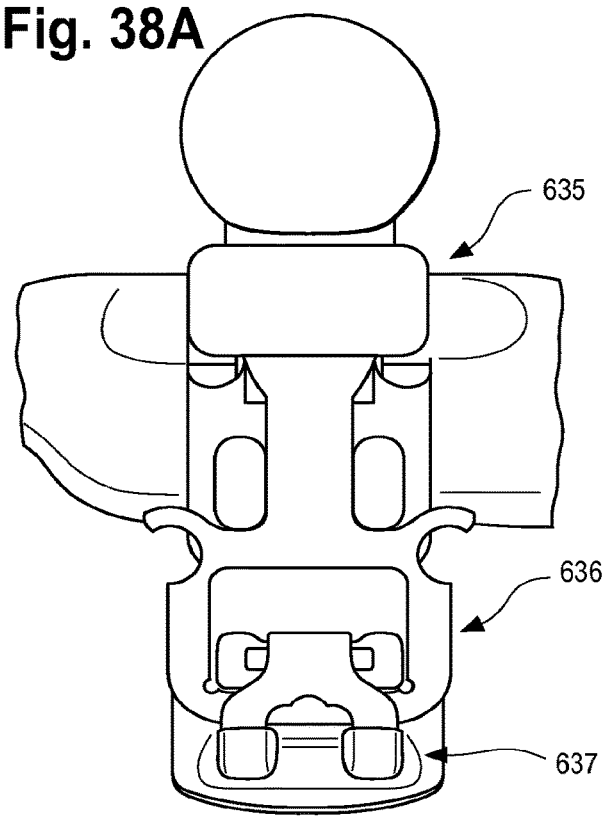
FIGS. 38A-38H display the steps of the process of preparing a jig, bonding a bracket to a tooth, and subsequently removing the cap and the bracket holder.
Figure 38B:
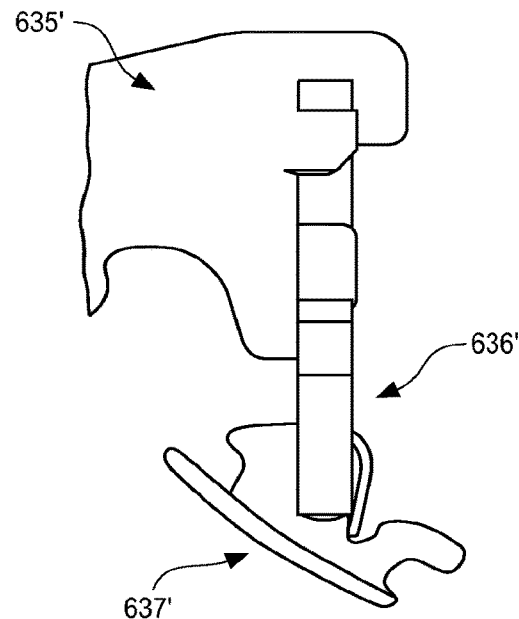
Figure 38C:
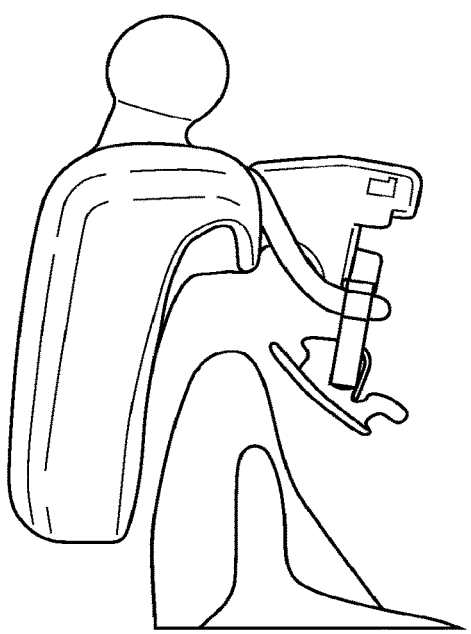
Figure 38D:
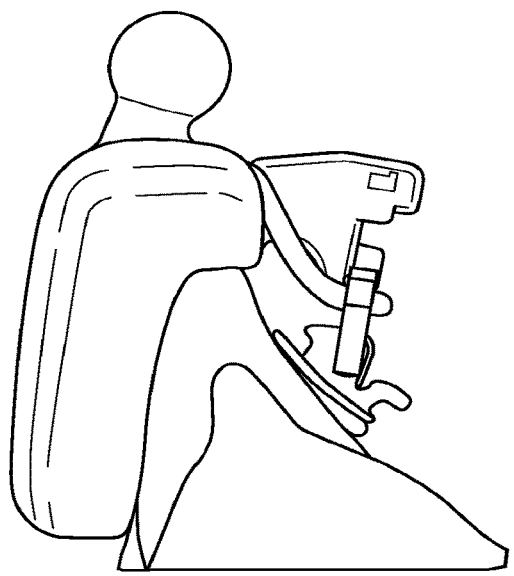

Step 2. Bond Brackets a. Make sure that the bracket holder is in position before placing the jig. See FIGS. 38A and 38B to position the bracket holder. FIG. 38A shows the front view with the cap 635, the bracket holder 636 and the bracket 637. FIG. 38B shows the side view with the cap 635', the bracket holder 636' and the bracket 637'.

b. Place the single jig on the tooth and remove exceeding glue if needed. See FIG. 38C which sows mounting the cap with the bracket on to the tooth.

c. Fix the Jig before light hardening. See FIG. 38D which shows bonding the bracket to the tooth.

Figure 38E:
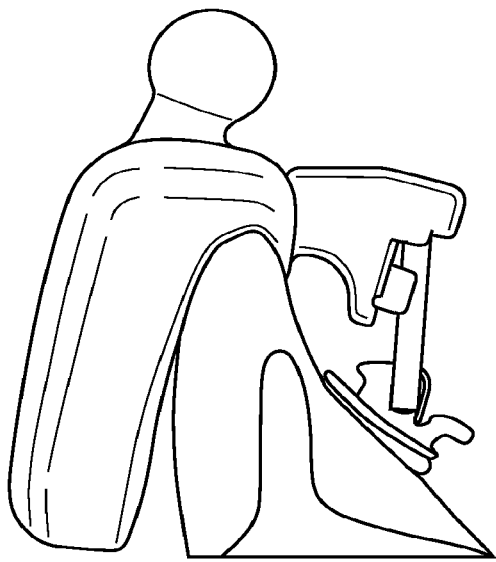
Figure 38F:
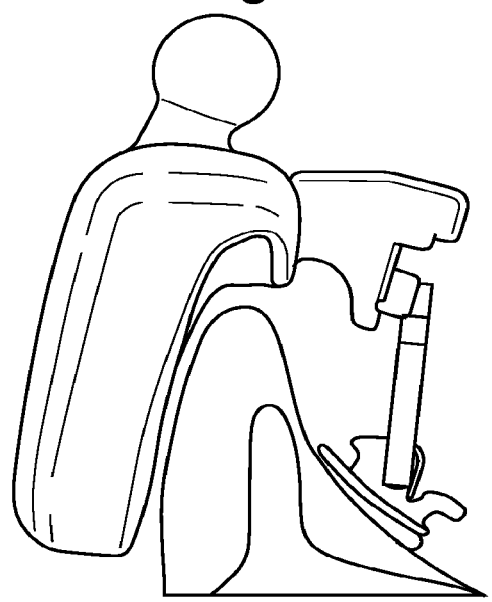
Figure 38G:
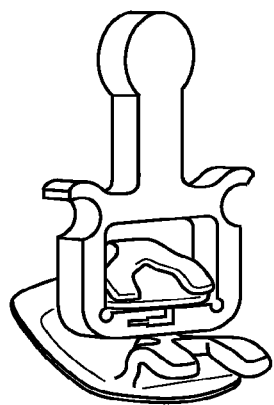
Figure 38H:
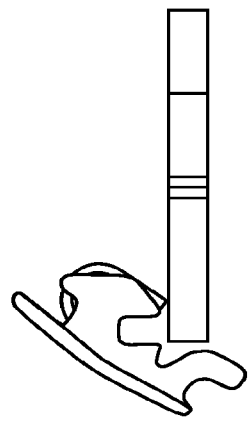

Step 3. Remove cap and Bracket holder a. Remove O-ring.

b. Remove the cap by swiveling the lower part of the cap as shown. Use a small tool to start the swiveling, See FIGS. 38E and 38F which show the steps of removing the cap after bonding the bracket to the tooth. FIG. 38E shows moving the cap away from the tooth; and then FIG. 38F shows lifting the cap upwards for removing the cap.

c. Open the bracket door (see FIG. 38G).

d. Remove the metal bracket holder from the bracket (see FIG. 38H).

Figure 39:
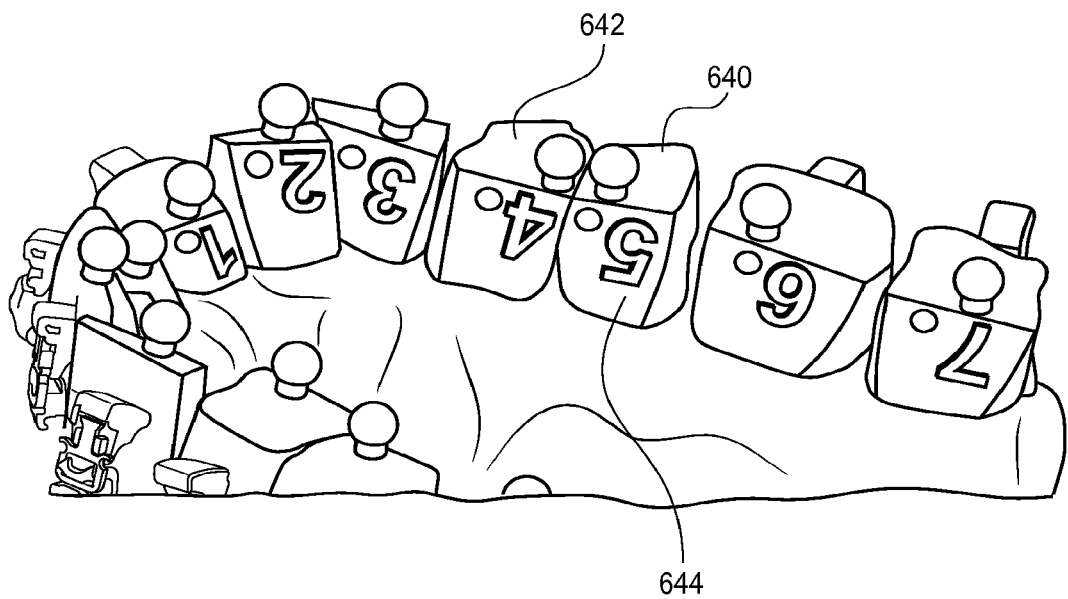
FIG. 39 shows separated jigs designed for two specific teeth. Tooth number is engraved on the jig.

FIG. 39 shows separated jigs 640 and 642 designed for two specific teeth. Tooth number 644 is engraved on the jig.

Figure 40:
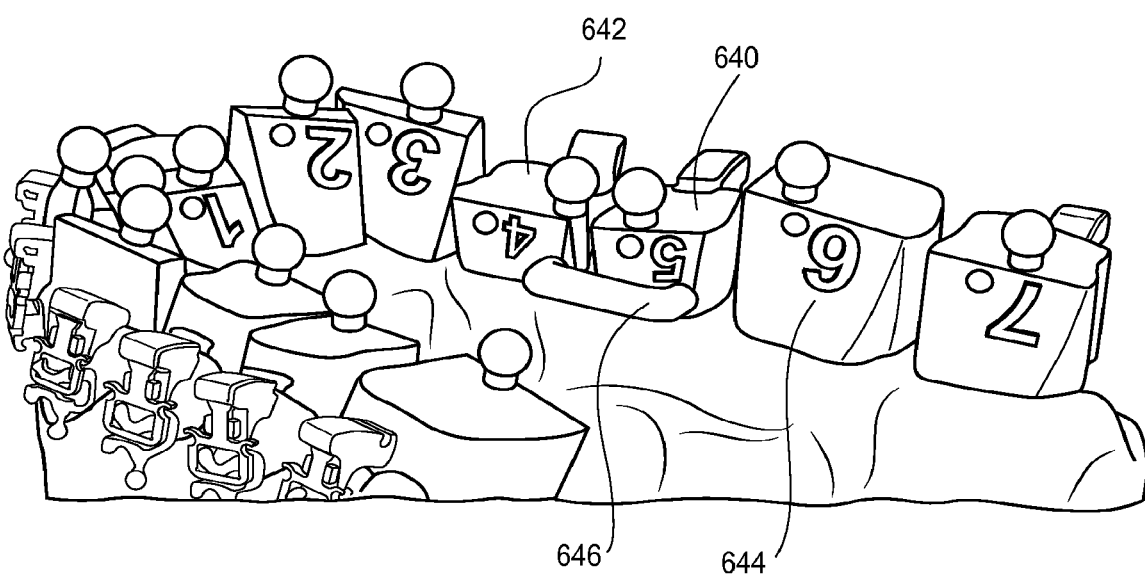
FIG. 40 shows a spline joining the separated two jigs shown in FIG. 39.

FIG. 40 shows a spline 646 joining the separated two jigs shown in FIG. 39. The figure also shows the jigs 640 and 642 and tooth number 644.

Although the preferred embodiment of the disclosure disclosed above describes the design of the TAP device based upon the target set-up determined through treatment planning, one would appreciate that the TAP device can be designed simply based upon the placement of the brackets on the dentition determined by any method, such as placing the brackets by a practitioner on the malocclusion based on gut-fill and experience or any other method including combination of treatment planning and best judgment. Furthermore, the TAP device can be made for bracket or other attachment placement at any point during the treatment. In other words, the TAP device is not limited for use only with the final stage of the treatment.

It should be noted that the TAP device can be used for placement of any type of attachment, including brackets, attachments for aligners, pad attachments or any other type of attachment for placement on a patient's dentition.

Attachment Placement Verification

It is important to verify accuracy of the placement of the attachments on the teeth using the TAP device. The placement accuracy verification process is described below.

Figure 41:
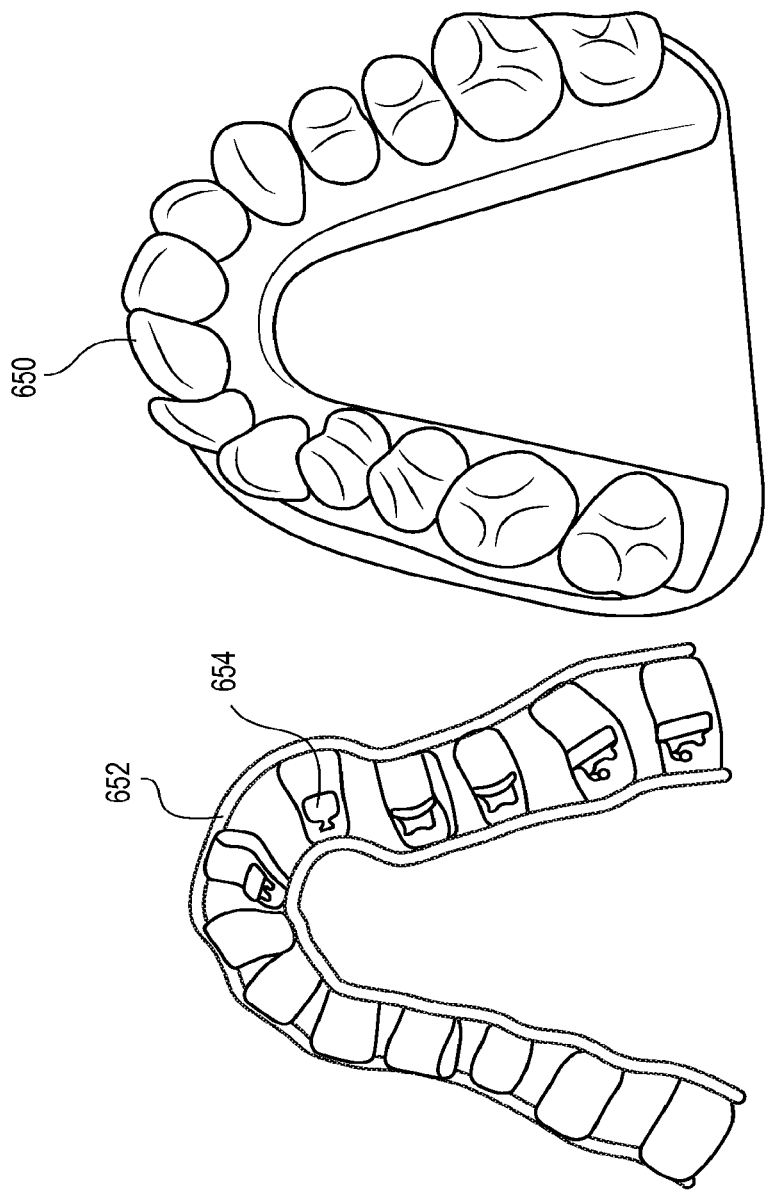
FIG. 41 shows a TAP device and a malocclusion model of the dentition of a patient and the brackets are bonded on a quadrant of the malocclusion model in order to determine the accuracy of the placements of the brackets.

FIG. 41 shows a TAP device 652 and a malocclusion model 650 of the dentition of a patient and the brackets 654 are bonded on a quadrant of the malocclusion model in order to determine the accuracy of the placements of the brackets.

Figure 42:
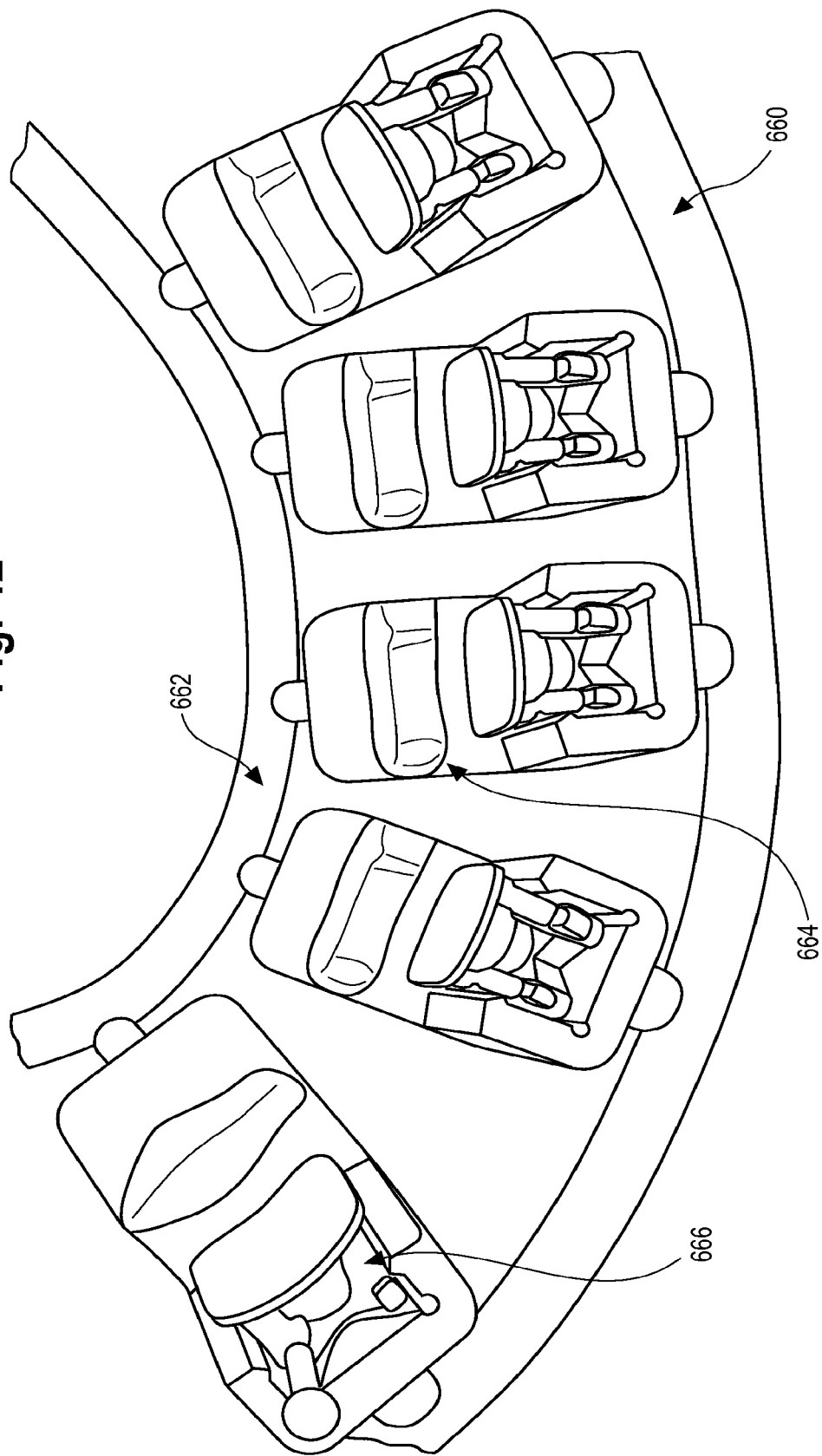
FIG. 42 shows the TAP device with the brackets.

FIG. 42 shows the TAP device with the main spline 660, the cut-off spline 662, the cap 664 and the bracket 666.

Figure 43:
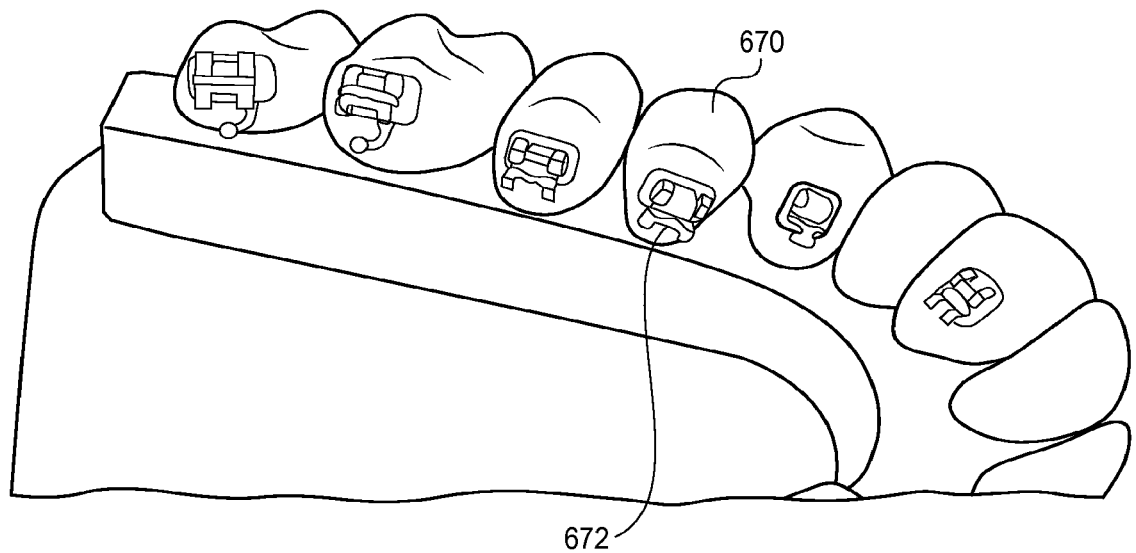
FIG. 43 shows the brackets bonded to the teeth.

FIG. 43 shows the mold of the dentition taken from impression with the brackets 672 placed on the teeth 670 using the TAP device created for the patient. This method can be used to evaluate the accuracy of the TAP device before actually using it to place and bond the brackets to the teeth of the patient.

Figure 44:
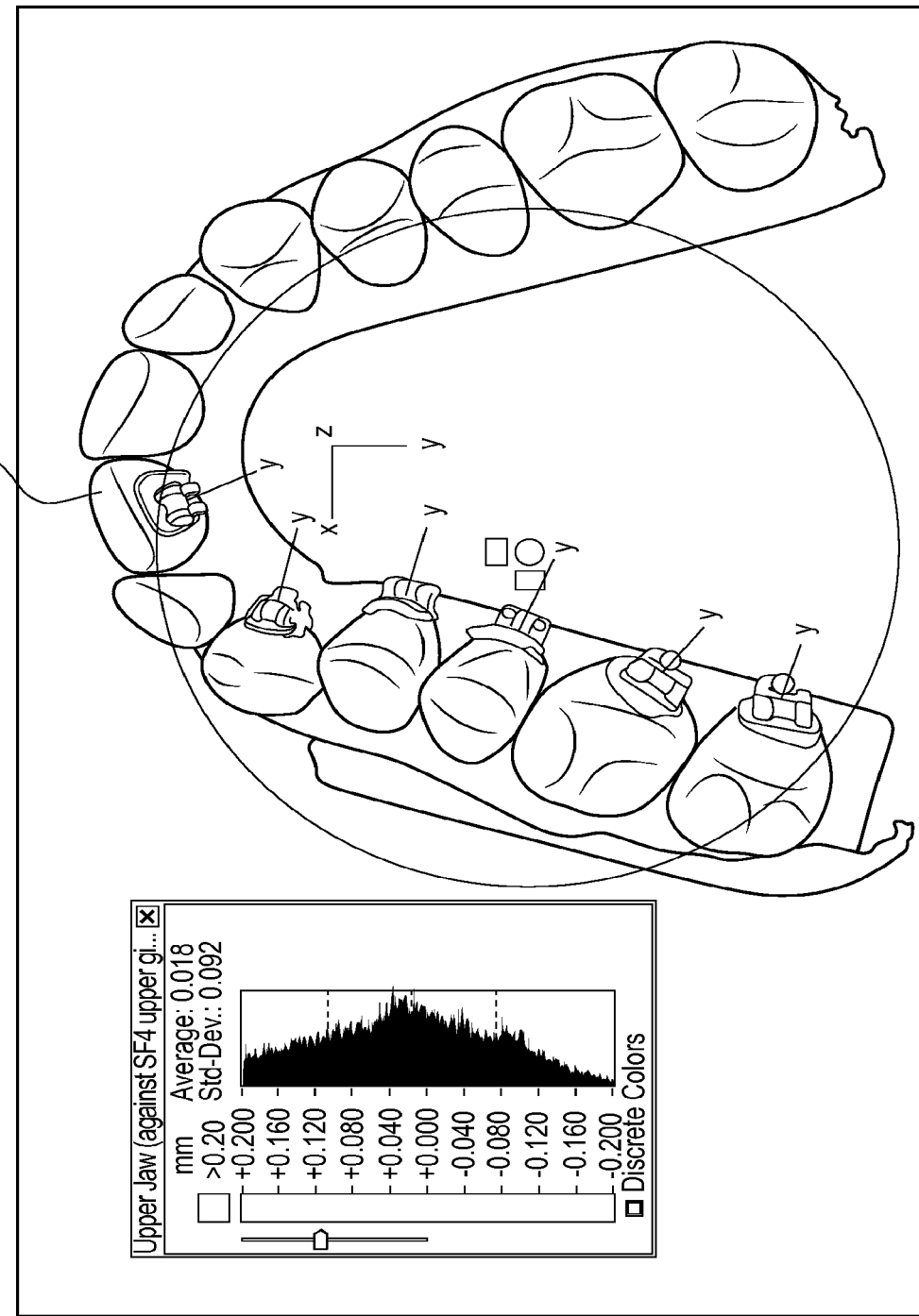
FIG. 44 shows the in-vivo scanned image of the dentition after the brackets were bonded to the teeth using a customized TAP device. This image enables verification of the accuracy of the placement of the brackets on the teeth.

FIG. 44 shows the in-vivo scanned image 680 of the dentition after the brackets were bonded to the teeth using a customized TAP device. This image enables verification of the accuracy of the placement of the brackets on the teeth. FIG. 44 shows the deviation between the planned and real bracket position.

Figure 45:
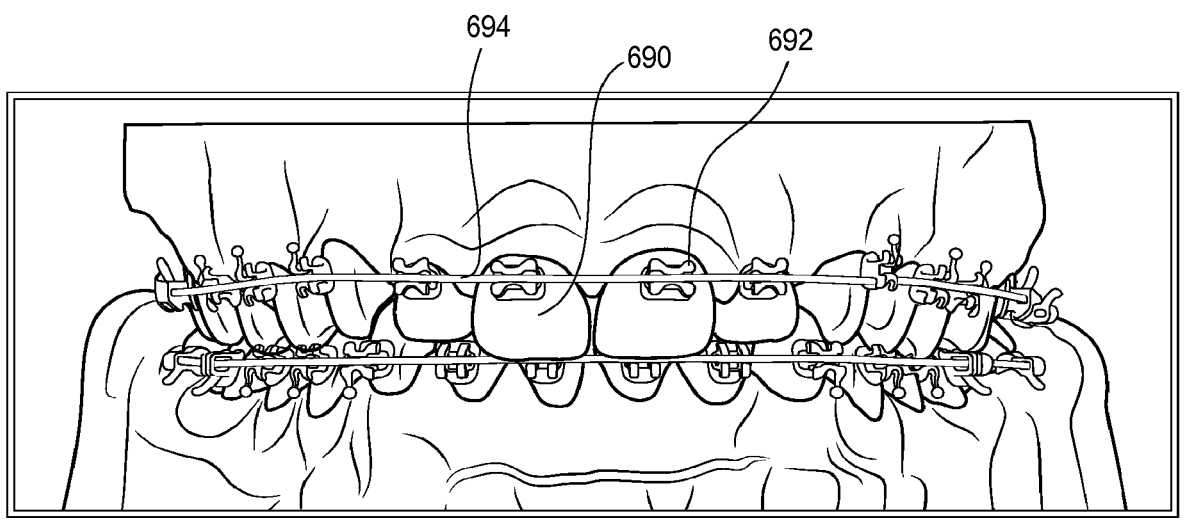
FIG. 45 shows archwire placement through the bonded brackets for verification of the accuracy of the placement of the brackets on the teeth.

FIG. 45 shows archwire 694 placement through the bonded brackets 692 for verification of the accuracy of the placement of the brackets on the teeth 690.

Figure 46:
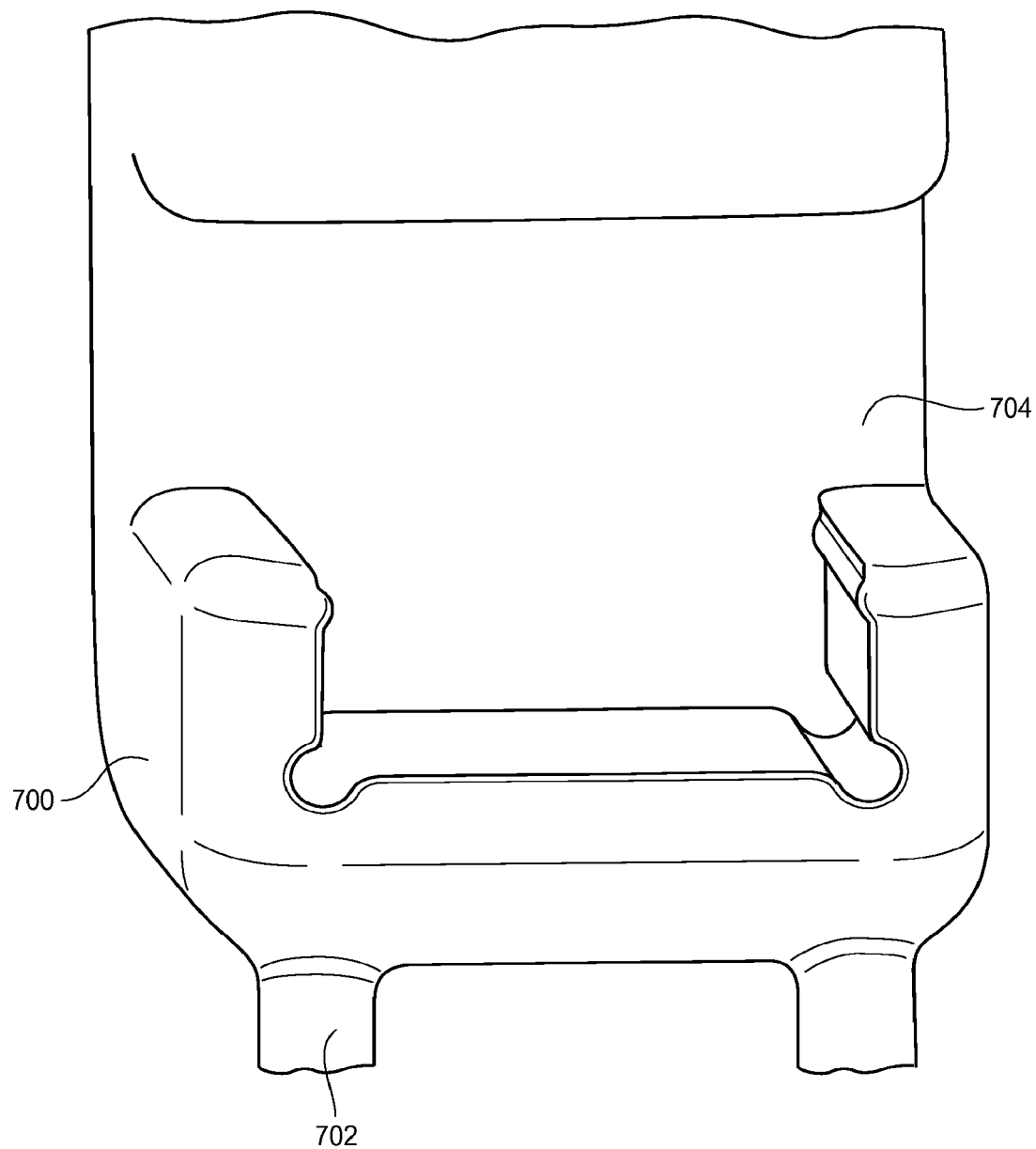
FIG. 46 shows a jig with the bracket portion cutout. Such a jig can be placed on a patient's tooth and the cutout portion marked to see where the bracket will be attached. The marked area then can be cleaned. Also, the marked area can be used to verify the accuracy of the placement of the bracket on the tooth.

FIG. 46 shows a jig 700 with the bracket portion 704 cutout. Such a jig can be placed on a patient's tooth and the cutout portion marked to see where the bracket will be attached. The marked area then can be cleaned. Also, the marked area can be used to verify the accuracy of the placement of the bracket on the tooth. Also shown is a portion of the spline 702.

Figure 47:
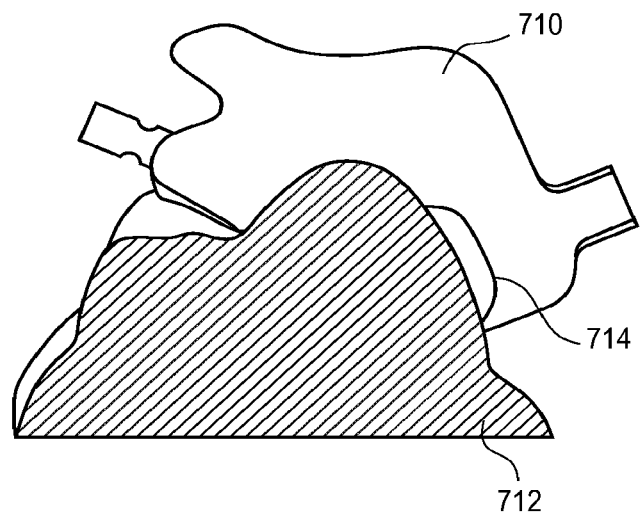
FIG. 47 shows an attachment different from a bracket, such as an attachment to be placed on a tooth for an aligner, placed on the jig of a TAP device.
Figure 47A:
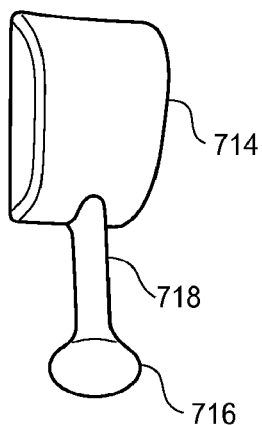
FIG. 47A shows the attachment in more detail.

FIG. 47 shows a bracket holder 710 with an attachment 714 different from a bracket, such as an attachment to be placed on a tooth for an aligner, placed on the jig of a TAP device for placing the attachment on a tooth 712. In this manner, the customized TAP device can be used to place attachments on the teeth of a patient. FIG. 47A shows the attachment 714 in more detail. The figure shows pad 716 and staff 718.

Figure 47B:
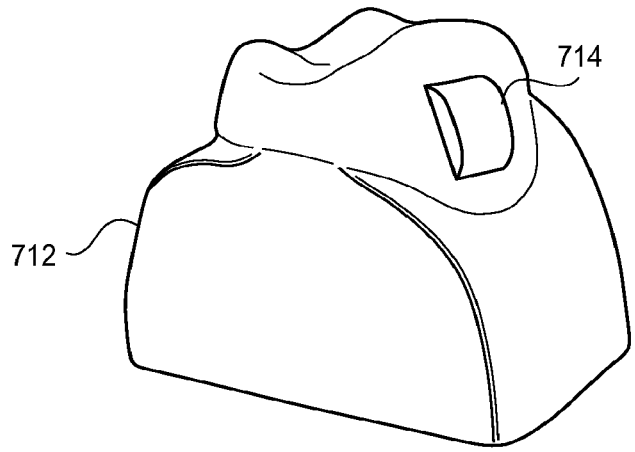
FIG. 47B shows the attachment mounted on the tooth.

FIG. 47B shows the attachment 714 mounted on the tooth 712.

Figure 48:
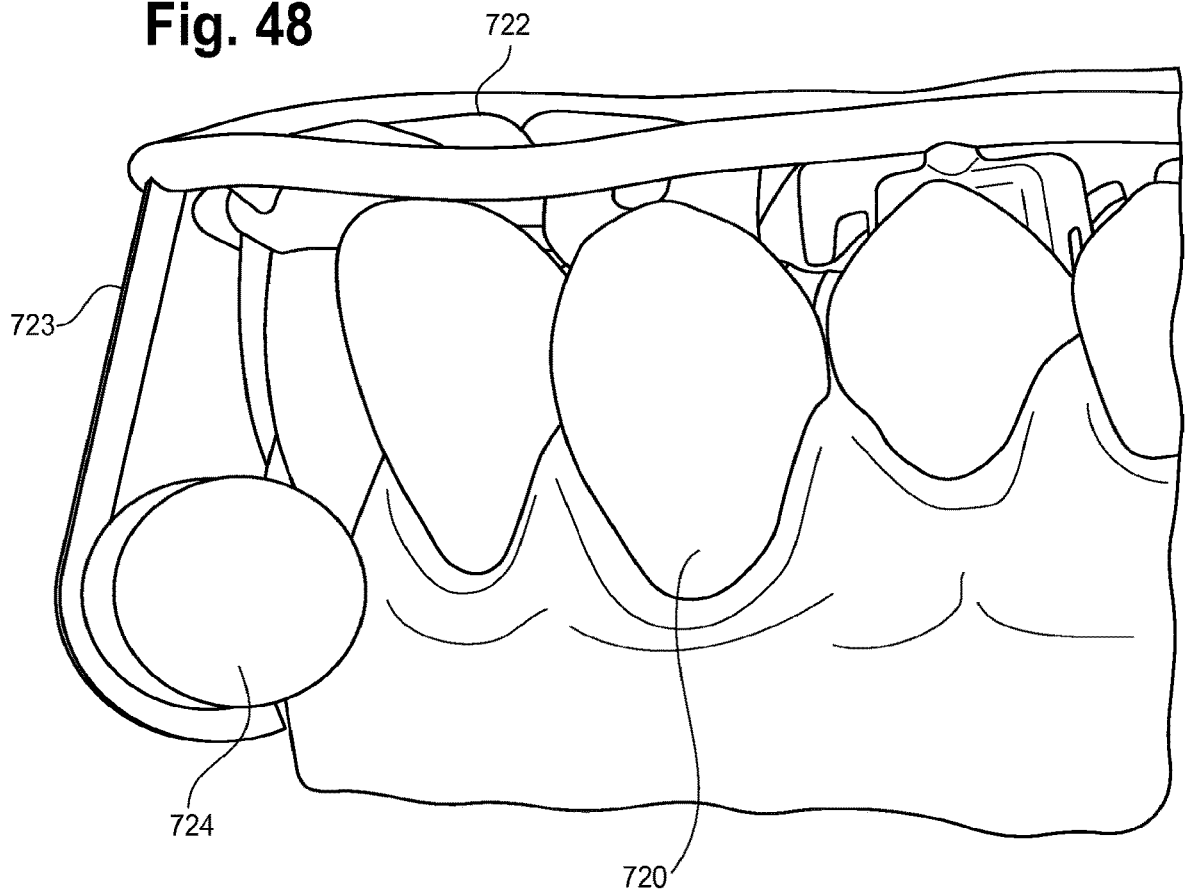
FIG. 48 shows a cotton roll attached to the shim of the TAP device. The cotton roll will absorb the saliva of a patient when the TAP device is used to place the brackets or other attachments on the teeth of a patient.

FIG. 48 shows a cotton roll 724 attached to the shim 722 of the TAP device. The cotton roll will absorb the saliva of a patient when the TAP device is used to place the brackets or other attachments on the teeth 720 of a patient. Although not shown in this figure, a tongue blocker can also be attached to the shin of the TAP device in order to prevent the tongue of the patient from interfering with the placement of the TAP device on the dentition of the patient.

Figure 49:
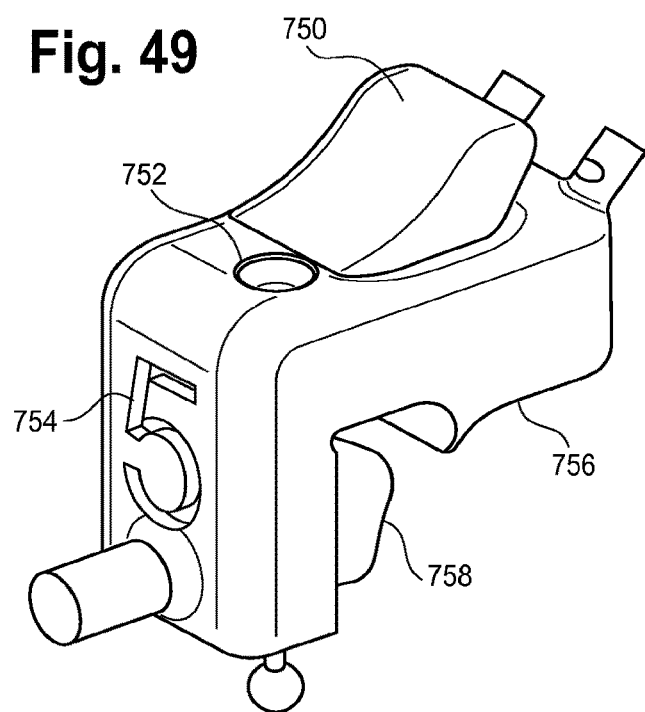
FIG. 49 shows a different configuration of the bracket holder which makes it easier to remove the TAP device jig after the bracket is placed and bonded to a tooth.

FIG. 49 shows a different configuration of the bracket holder which makes it easier to remove the TAP device jig after the bracket is placed and bonded to a tooth. FIG. 49 shows lug 750 for prying cap from the bracket after the bracket is bonded to the tooth. Additionally, the figure shows distal indicator 752, tooth number 754 for which the bracket holder is designed, the bracket holder cap 756 and the bracket 758.

Modifications to the illustrated embodiments are within the scope of the disclosure. The scope is to be determined by reference to the appended claims, interpreted in light of the foregoing specification.

We claim:

1. A tooth attachment placement device comprising:
   a geometry derived from an inverse shape of a virtual model of a dentition of a patient having virtual orthodontic brackets placed thereon, the geometry having an upper spline and a lower spline with a plurality of fixed single tooth jigs interconnected therebetween such that the upper spline and the lower spline extend along a portion of the geometry of the tooth attachment placement device to define a complimentary inverse shape of a virtual model; wherein the plurality of fixed single tooth jigs are configured for placement of orthodontic brackets that correspond to the virtual orthodontic brackets on teeth of the patient thereby enabling bonding of the orthodontic brackets to the teeth at desired locations.

2. The tooth attachment placement device of claim 1, wherein the upper spline and the lower spline comprise snap points configured for breaking sections of the upper spline and/or the lower spline apart.

3. The tooth attachment placement device of claim 1, wherein each of the plurality of single tooth jigs comprises a cap, a metal bracket holder, and an O-ring.

4. The tooth attachment placement device of claim 1, wherein the tooth attachment placement device is formed from a non-flexible biocompatible material.

5. The tooth attachment placement device of claim 1, wherein the tooth attachment placement device is formed from a semi-flexible material or a flexible material.

6. The tooth attachment placement device of claim 1, wherein at least two of the plurality of single tooth jigs are of different widths.

7. The tooth attachment placement device of claim 1, further comprising over mold retention pegs attached to and extending from at least one of the upper spline and the lower spline.

8. The tooth attachment placement device of claim 1, wherein the tooth attachment placement device comprises clear/transparent or translucent material for carrying ultra-violet light for curing bracket pads attached to surfaces of the teeth.

9. The tooth attachment placement device of claim 8, wherein the upper spline and the lower spline comprise clear/transparent or translucent material for carrying ultra-violet light for curing bracket pads attached to the surfaces of the teeth.

10. The tooth attachment placement device of claim 8, wherein the upper spline and the lower spline are of tubular form for carrying ultra-violet light for curing bracket pads attached to the surfaces of the teeth.

11. The tooth attachment placement device of claim 1, wherein each of the plurality of single tooth jigs includes a tooth number affixed on the single tooth jig.

12. The tooth attachment placement device of claim 1, further comprising a patient identifier.

13. The tooth attachment placement device of claim 1, further comprising at least one tooth-sized gap between single tooth jigs.

14. The tooth attachment placement device of claim 1, wherein the tooth placement device is created with generative manufacturing technologies.

15. The tooth attachment placement device of claim 1, wherein the plurality of fixed single tooth jigs are in a fixed position.

* * * * *